US011445038B2

(12) United States Patent
Colenbrander

(10) Patent No.: US 11,445,038 B2
(45) Date of Patent: Sep. 13, 2022

(54) SYSTEMS AND METHODS FOR DOWNLOADING AND UPDATING SAVE DATA TO A DATA CENTER

(71) Applicant: Sony Interactive Entertainment LLC, San Mateo, CA (US)

(72) Inventor: Roelof Roderick Colenbrander, Costa Mesa, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 112 days.

(21) Appl. No.: 16/944,057

(22) Filed: Jul. 30, 2020

(65) Prior Publication Data
US 2020/0358884 A1 Nov. 12, 2020

Related U.S. Application Data

(63) Continuation of application No. 15/374,409, filed on Dec. 9, 2016, now Pat. No. 10,742,767.

(60) Provisional application No. 62/290,370, filed on Feb. 2, 2016.

(51) Int. Cl.
*A63F 13/49* (2014.01)
*H04L 67/131* (2022.01)
*A63F 13/352* (2014.01)
*H04L 67/1097* (2022.01)
*A63F 13/355* (2014.01)
*A63F 13/493* (2014.01)
*H04L 67/1001* (2022.01)

(52) U.S. Cl.
CPC ............ *H04L 67/38* (2013.01); *A63F 13/352* (2014.09); *A63F 13/355* (2014.09); *A63F 13/493* (2014.09); *H04L 67/1002* (2013.01); *H04L 67/1097* (2013.01)

(58) Field of Classification Search
None
See application file for complete search history.

(56) References Cited

U.S. PATENT DOCUMENTS

| 8,775,449 B2* | 7/2014 | Quan | A63F 13/23 707/757 |
| 2005/0245317 A1* | 11/2005 | Arthur | A63F 13/795 463/42 |
| 2012/0252582 A1* | 10/2012 | Hilleman | H04L 67/142 463/43 |
| 2012/0278439 A1* | 11/2012 | Ahiska | G06F 9/44568 709/218 |
| 2013/0005489 A1* | 1/2013 | Santhosh | A63F 13/213 463/43 |
| 2013/0231194 A1* | 9/2013 | Wang | A63F 13/79 463/43 |
| 2016/0023109 A1* | 1/2016 | Colenbrander | A63F 13/95 463/43 |

(Continued)

*Primary Examiner* — Tramar Harper
(74) *Attorney, Agent, or Firm* — Penilia IP, APC

(57) ABSTRACT

Systems and methods for downloading and updating save data to a data center are described. Save data is downloaded from a cloud storage to the data center before play of a game to cache the save data in the data center. Any updates to the save data that occur during a play of a game are stored in the data center and are uploaded to the cloud storage. Next time, a user desires to access the game, there is no need to transfer the updates to the data center from the cloud storage.

20 Claims, 18 Drawing Sheets

(56) References Cited

U.S. PATENT DOCUMENTS

2016/0184712 A1* 6/2016 Colenbrander ......... A63F 13/49
                                                                463/29
2016/0346689 A1* 12/2016 Vukojevic ............... A63F 13/88
2016/0361646 A1* 12/2016 Perry .................. H04N 21/2668
2017/0050111 A1* 2/2017 Perry ...................... H04L 67/38

* cited by examiner

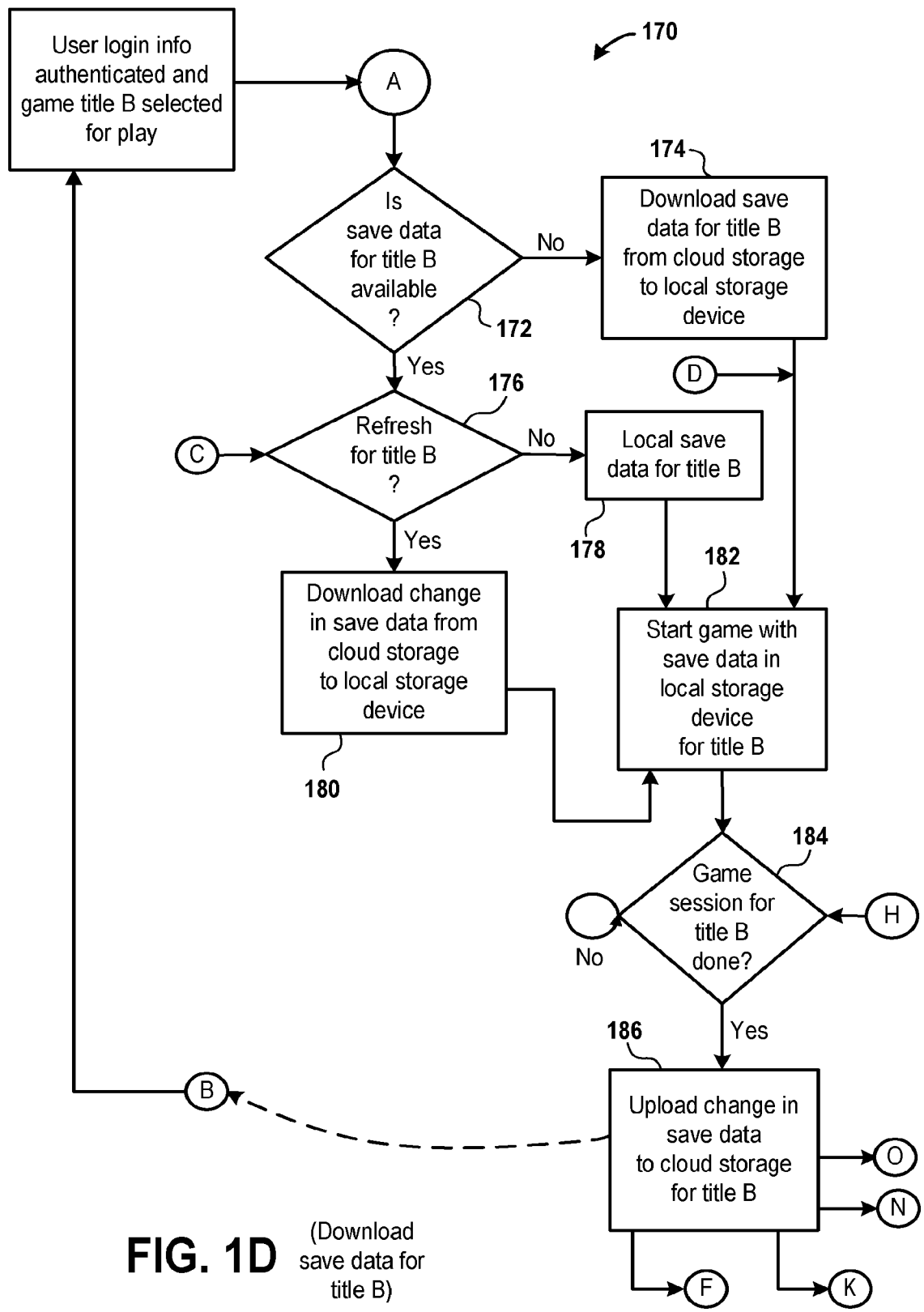
FIG. 1D (Download save data for title B)

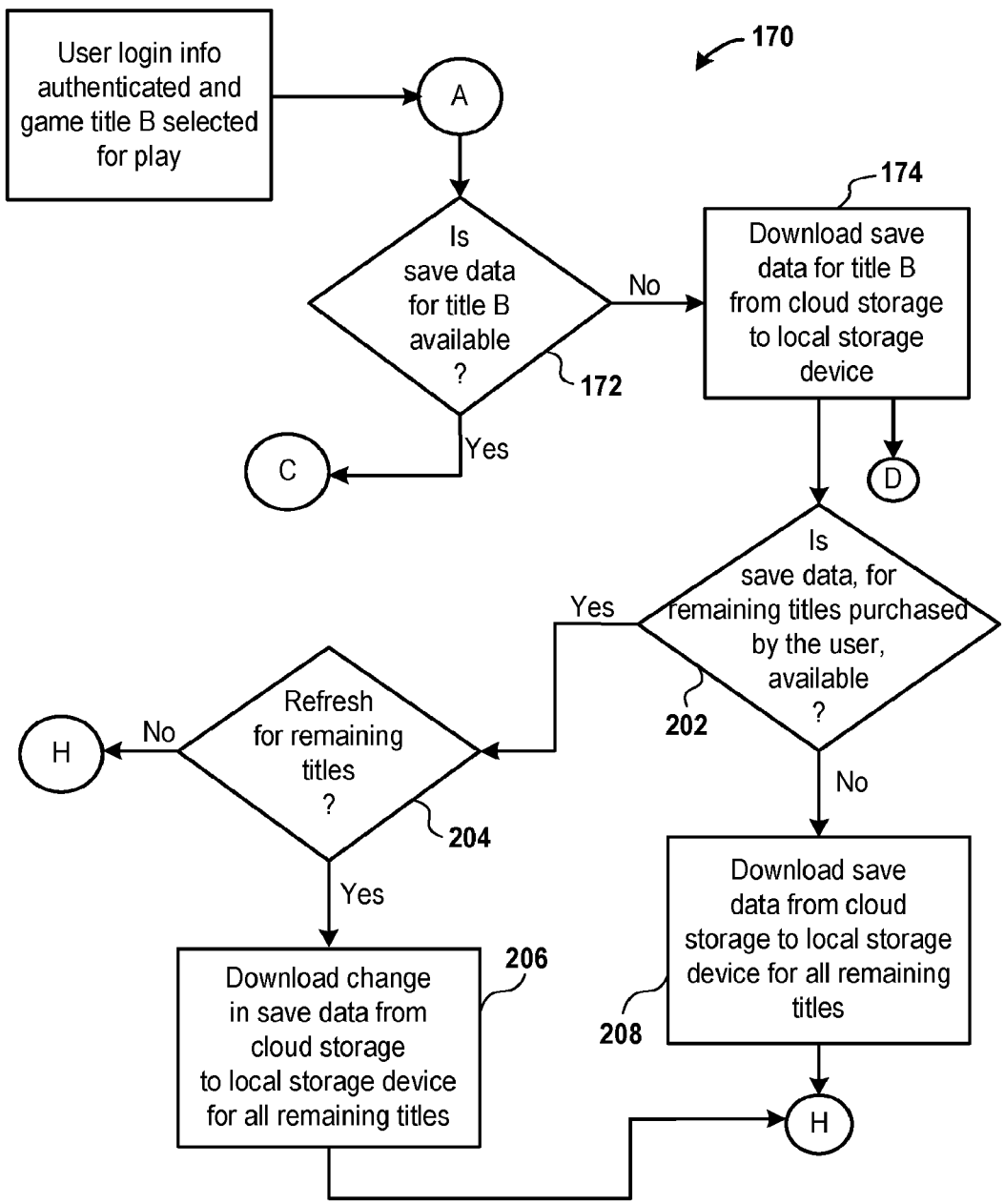
FIG. 2 (Download save data for remaining titles while title B is being played by user)

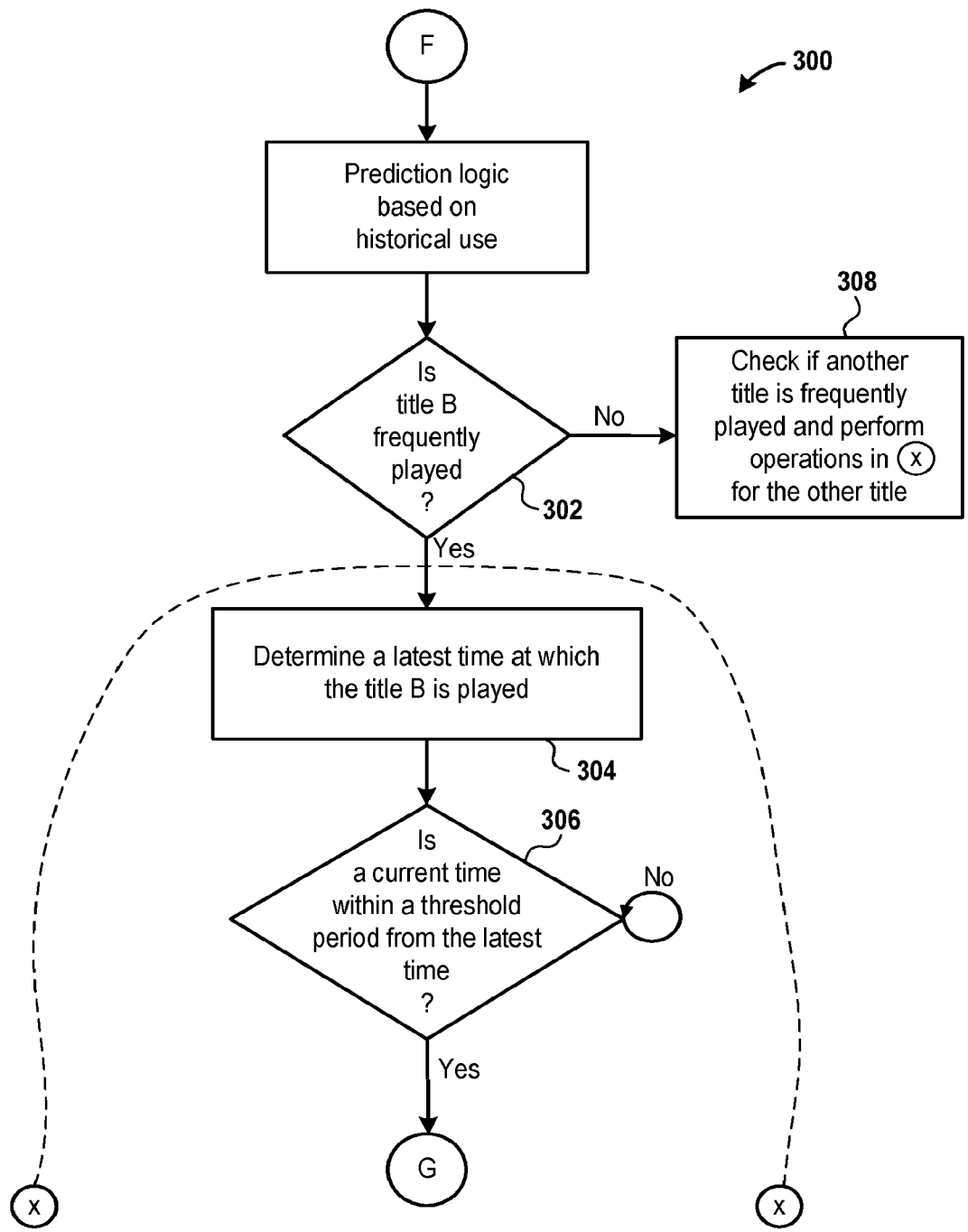
FIG. 3A (Download based on historical use)

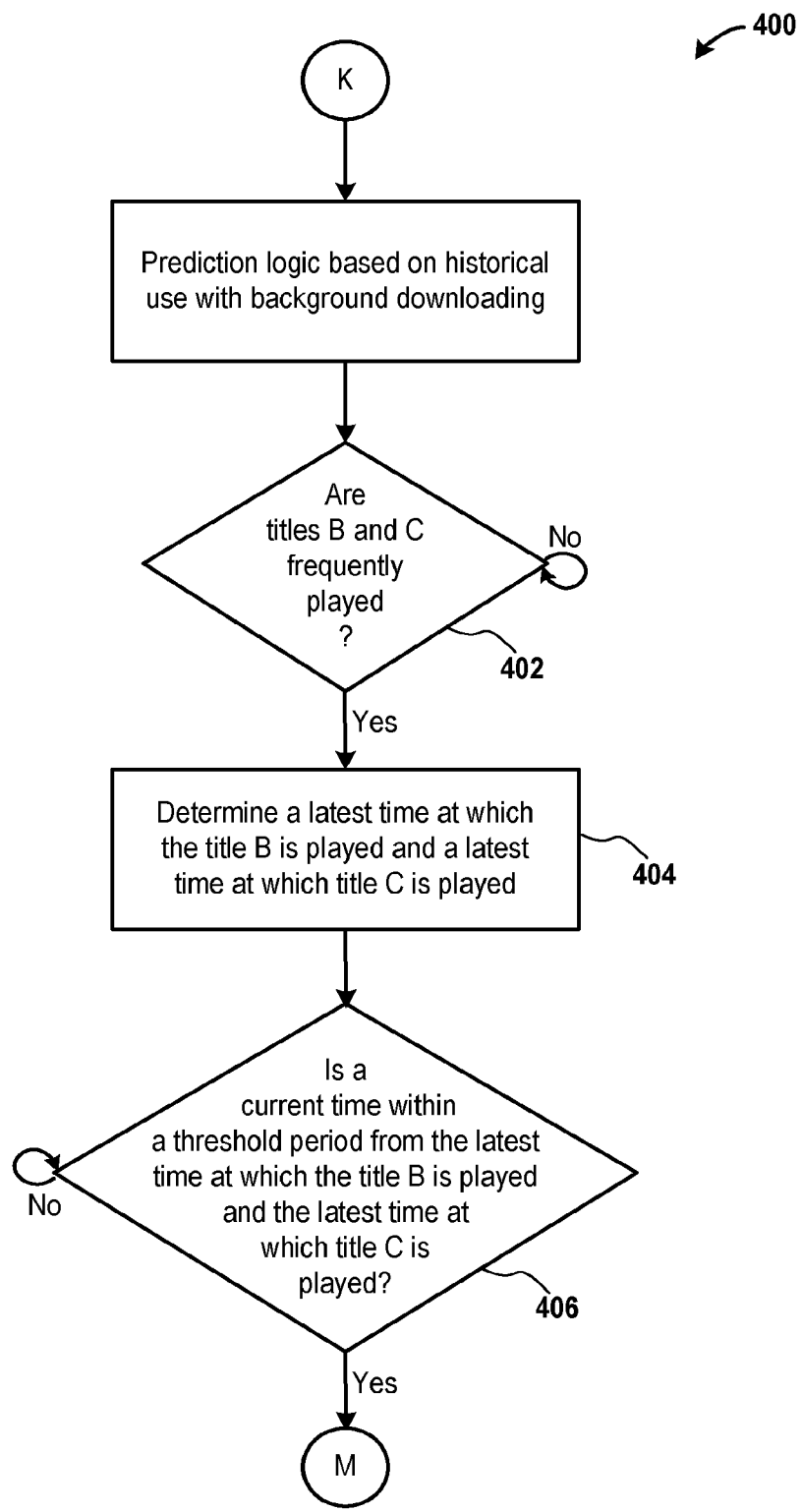
FIG. 4A (Prediction logic with background downloading)

SYSTEMS AND METHODS FOR DOWNLOADING AND UPDATING SAVE DATA TO A DATA CENTER

CLAIM OF PRIORITY

The present patent application is a continuation of and claims the benefit of and priority, under 35 U.S.C. § 120, to U.S. patent application Ser. No. 15/374,409, filed on Dec. 9, 2016, and titled "Systems and Methods for Downloading and Updating Save Data to a Data Center", which claims the benefit of and priority, under 35 U.S.C. § 119(e), to U.S. Provisional Patent Application No. 62/290,370, filed on Feb. 2, 2016, and titled "Systems And Methods For Downloading And Updating Save Data To A Data Center", all of which are hereby incorporated by reference in their entirety.

FIELD

The present patent application relates to methods and systems for downloading and updating save data within a data center.

BACKGROUND

As Internet broadband speeds have been increasing and broadband connectivity has become more widespread in the US and worldwide, games are increasingly being distributed via downloads to personal computers (PCs) or consoles. Also, broadband connections are increasingly used for playing multiplayer and massively multiplayer online games.

During game play, large data downloads are performed to provide graphics or behavioral information to the local PC or console. For example, if a user enters a room in a game and encounters a scene or a character made up of graphics data or with behaviors that are not available on the user's local machine, then that scene or character's data is downloaded.

It is in this context that embodiments of the invention arise.

SUMMARY

Embodiments described in the present disclosure provide methods and systems for downloading and updating save data within a data center.

In some embodiments, for cloud gaming, save data is stored remotely in a cloud storage, e.g., a cloud storage owned by an entity, etc. The save data is used to generate intensive graphics and consumes a high amount of network bandwidth, and memory storage space. The cloud storage has no processor for processing the save data to generate image frames for playing a game. Once a user initiates a game session using a game console, which is a portion of a client device, the game console requests a game hosting system that the image frames for the game be downloaded to the client device as soon as possible. Upon receiving the request, the save data is downloaded from the cloud storage to a data center that is suitable to a location of the client device and transferred to the client device from the data center. After the game session ends, any changes to the save data that occur during the game session are stored in the data center. After the game session ends, during another game session, image frames are generated from the changes to the save data, and the image frames are accessed by the client device from the same data center. This reduces latency associated with transferring the changes to the save data from the cloud storage to the data center. The reduction in latency increases throughput of transfer of data from the data center to the client device. Moreover, after the game session ends, the changes to the save data are uploaded from the data center to the cloud storage for access by the user from another data center. The user accesses image frames generated from the changes from the other data center.

In some embodiments, a method for maintaining a caching layer of save data current for game play from a streaming service is described. The method includes receiving a selection of a game title displayed on a client device via a computer network. The method further includes identifying a data center from a plurality of data centers for transferring image frames of the game title to the client device via the computer network upon receiving the selection of the game title. The image frames include additional information that is generated based on save data associated with the game title. The identified data center includes one or more processors for accessing the save data and one or more local storage devices for storing the save data. The method includes determining whether the save data for playing the game is stored in one of the one or more local storage devices of the identified data center upon receiving the selection of the game title. The method includes downloading the save data from a cloud storage in response to determining that the save data is not stored in the local storage device, generating the image frames from the save data, transferring the image frames to the client device for display via the computer network to facilitate a play of the game title during a game session, and receiving one or more game inputs from the client device via the computer network during the game session. The method includes storing an update to the save data within the one or more local storage devices based on the one or more game inputs, receiving an indication from the client device via the computer network that the game session has ended, and transferring the update to the save data via the computer network to the cloud storage upon receiving the indication that the game session has ended.

Other aspects described in the present disclosure will become apparent from the following detailed description, taken in conjunction with the accompanying drawings, illustrating by way of example the principles described in the present disclosure.

BRIEF DESCRIPTION OF THE DRAWINGS

Various embodiments of the present disclosure are best understood by reference to the following description taken in conjunction with the accompanying drawings in which:

FIG. 1A-2 is a diagram of an embodiment of a system for illustrating transfer of data from a local storage device local with respect to the data center A and transfer of updated save data from a save data processor of the data center A to the local storage device.

FIG. 1C-1 is a diagram of an embodiment of a system to illustrate updating of save data within the data center A from the cloud storage.

FIG. 1C-2 is a diagram of an embodiment of a system in which each data center A through N1 is associated has a corresponding local storage device.

FIG. 1D is a flowchart of an embodiment of a method for illustrating access of the save data from the cloud storage by the data center A and use of the save data for playing a game identified by a Title B.

FIG. 2 is a flowchart of an embodiment of a method to illustrate background downloading of save data for an additional game title, other than the Title B, after the Title B is selected for game play for the game session.

FIG. 3A is a flowchart of an embodiment of a method for determining whether a user A will play a title and if so, downloading save data for the title before the user requests the title for game play.

FIG. 4A is a flowchart of an embodiment of a method to illustrate background downloading of a title that is frequently played when a game with another title that is frequently played is being played by the user A.

DETAILED DESCRIPTION

Figures 1, 1A:
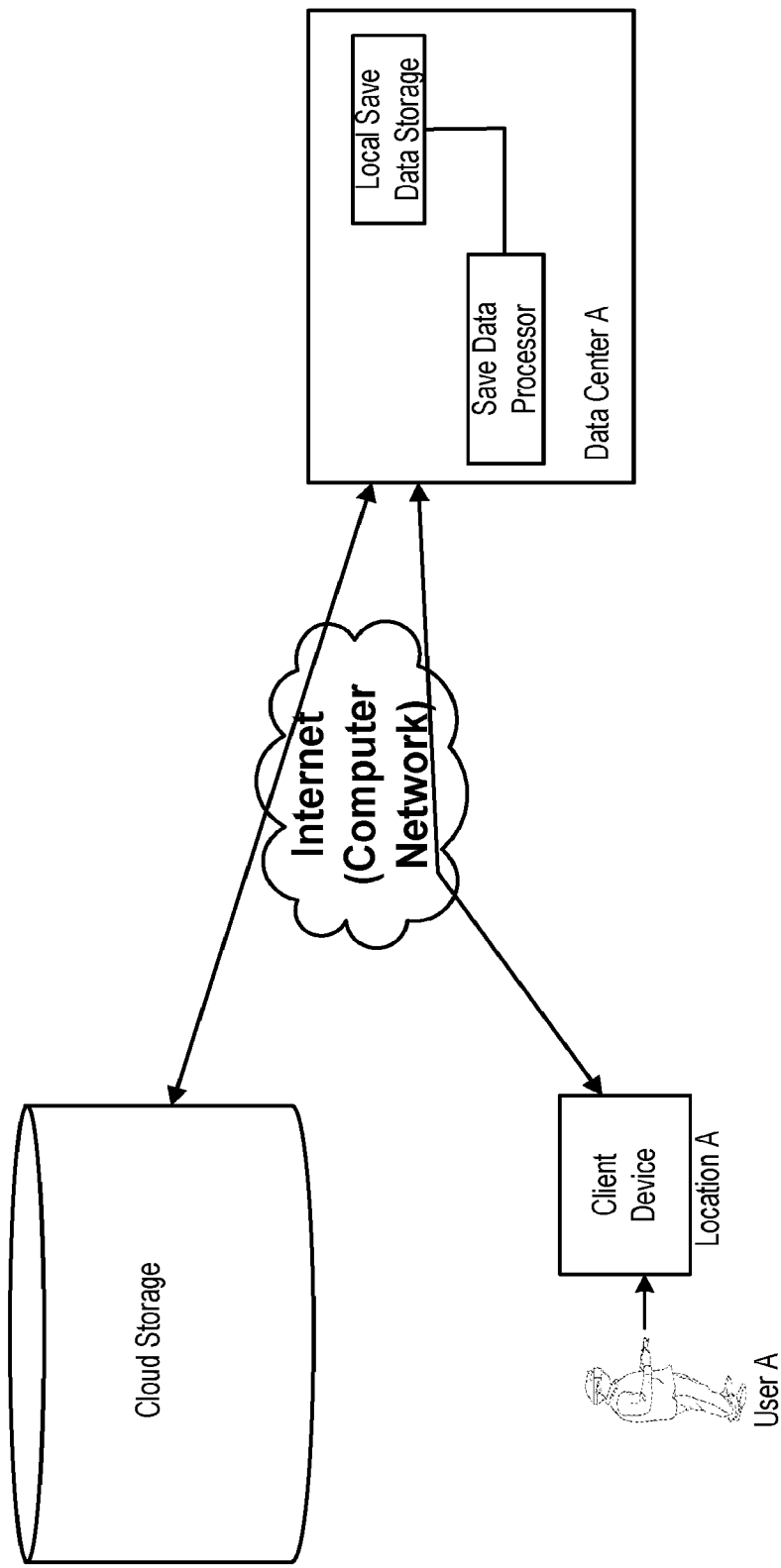
FIG. 1A-1 illustrates an embodiment of an exemplary system for illustrating a transfer of save data from a cloud storage to a data center A and vice versa.

Systems and methods for updating save data within a data center from a cloud data storage are described. It should be noted that various embodiments described in the present disclosure may be practiced without some or all of these specific details. In other instances, well known process operations have not been described in detail in order not to unnecessarily obscure various embodiments described in the present disclosure.

In some embodiments, save data is transferred from a cloud storage to a data center to cache the save data. When a user requests to play the game during a game session, the data center is selected based on suitability, e.g., distance of the data center from the client device, bandwidth of the data center, etc., and the save data is transferred from the cloud storage to the suitable data center. Image frames are generated from the save data and streamed from the suitable data center to the client device. For example, an image frame is generated by a processor of a game server by placing a virtual object at a location in the image frame. The location of the virtual object is specified in a file that has the save data. The location of the virtual object defines a point in a game code or a state at which a user stopped playing the game. The processor of the game server parses the file to identify the location to further generate the image frame in which the virtual object is placed at the location. Also, other attributes, e.g., a color, a texture, a shade, a shape, etc., of the virtual object are specified in the save data, e.g., one or more other files, etc. The attributes of the virtual object define one or more portions in the game code at which the user stopped playing the game. As another example, an image frame is generated by placing a background at a location in the image frame. The location, e.g., boundaries, co-ordinates, etc., of the background is specified in a file storing the save data. The location of the background defines a point in the game code or the state at which the user stopped playing the game. Also, other attributes, e.g., a color, a texture, a shade, a shape, etc., of the background are specified in the save data, e.g., one or more other files, etc. The attributes of the background define one or more portions in the game code at which the user stopped playing the game. The game code is not specific to the user but is equally applicable to multiple users. For example, when multiple users play the game, they go through the same levels in the game. Comparatively, the save data is specific to the user. To illustrate, the user stops playing the game at a different point in the game than another player. As another illustration, the user customizes the background or the virtual object to his/her liking compared to the other player.

In some embodiments, game content data, which is sometimes referred to herein as game data, is executed using a game code. The game content data includes, for example, textures of the virtual object, maps, shades of the virtual object, colors of the virtual object, location of the virtual object, textures of the background, shades of the background, colors of the background, orientation and position of the background. Comparatively, the save data is a progress of a user in the game. The save data includes some data regarding the state of the game, e.g., a location in the game code at which the user stopped playing the game, etc., textures that are customized by the user during play of the game, colors that are customized by the user during the play of the game, maps generated by the user during the play of the game, attributes customized by the user during the play of the game, etc.

At an end of the game session, any updates to the save data that occur during the game session are stored in the suitable data center and also uploaded from the suitable data center to the cloud storage. Moreover, during an additional session, when the user requests to play the game, the updates to the save data performed during the game session are used by the data center to generate image frames, which are transferred from the data center to the client device. The use of the suitable data center to store the updates reduces latency of transfer of the updates from the cloud storage to the data center and increases throughput of transfer of image frames that include additional information generated based on the updates from the data center to the client device.

FIG. 1A-1 is a diagram of an embodiment of a system for illustrating transfer of data from the cloud storage to a data center A and transfer of updated save data from the data center A to the cloud storage. For cloud gaming, save data is stored remotely in the cloud storage. For example, the save data is stored in the cloud storage and the cloud storage is within a different geographical region than a geographical region in which the data center is located. As yet another example, the cloud storage is accessed by the data center A via a computer network e.g., a local area network (LAN), a wide area network (WAN), or a combination thereof. In some embodiments, the cloud storage is owned by an entity different from an entity that owns the data center A. Examples of an entity include a corporation, a company, a limited liability partnership, and a limited liability corporation. During a streaming session, the save data is used. A caching layer is provided by the data center A in which the save data is downloaded from the cloud storage before game play. In various embodiments, the data center A is located within the same geographical region in which the user A is located.

When a user A is at a location A and accesses, via a client device, a game for a first time from the data center A, the save data for the game is downloaded from the cloud storage to the data center A. The save data is stored in the data center A for later access by the user A via the computer network. Any updates to the save data are stored during a play of the game are stored in the data center A, and the updates are transferred to the cloud storage from the data center A after an end of a game session to synchronize the cloud storage with the data center A.

Figures 1, 1A, 2:
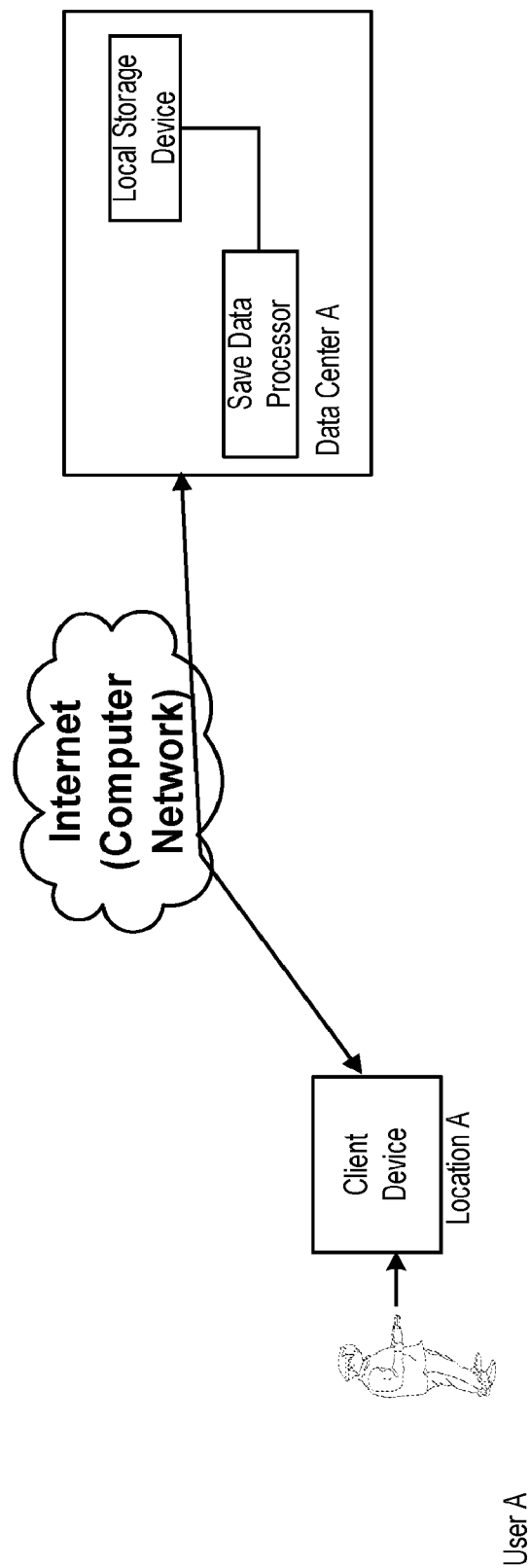

FIG. 1A-2 is a diagram of an embodiment of a system for illustrating access of data from a local storage device within the data center A and transfer of updated save data to the local storage device. The local storage device illustrated in FIG. 1A-2 is owned by the same entity that owns the data center A. Moreover, there is no need by the data center A to access the computer network to access the save data from the cloud storage. For example, a save data processor of the data center A reads the save data from the local storage device of the data center A and writes the updated save data to the local storage device.

Figure 1B:
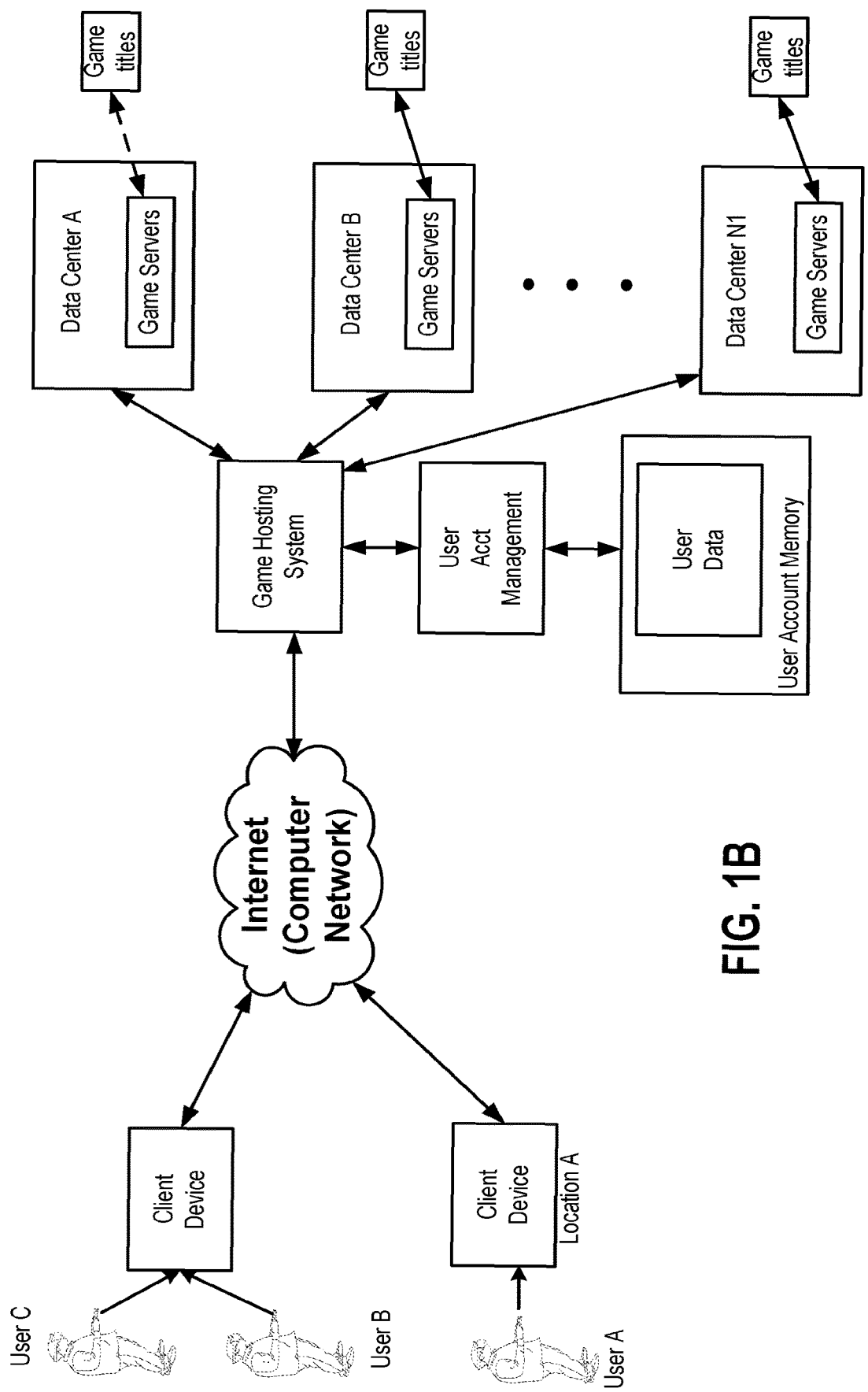
FIG. 1B illustrates an embodiment of an exemplary system used to load game files for a game available through a game hosting system.

FIG. 1B illustrates an exemplary system used to load game files for a game available through a game hosting system, which is sometimes referred to herein as a cloud gaming site. The system includes a plurality of client devices that are communicatively connected to the game hosting system over the computer network. When a request to access the game hosting system is received from the client device operated by the user A, the game hosting system accesses, via a user account management, user data stored in a user account memory device to identify a user accessing the game hosting system via the client device. In some embodiments, the game hosting system validates user login information to determine all the games the user is authorized to view/play. Following the validation of the user login information, the game hosting system accesses the user account memory device to identify the game titles that are available at the game hosting system for a user account for which the user login information is validated. The user account memory device stores metadata regarding video games purchased by a user. The user account memory device, in turn, provides game titles that are available for game play. As new games are introduced, the user account memory device will be updated with the newly introduced titles and the titles will be provided to the user account.

User interaction via the client device with one of the game titles rendered on the client device is detected and a signal is sent to the game hosting system. The signal includes the game title that is selected. In response to the signal received from the client device, the game hosting system proactively determines a data center where the game for the selected game title is being hosted and sends a signal to the identified data center to load the game code and save data associated with the game title. In some embodiments, more than one data center is hosting the game. In such embodiments, the game hosting system receives a geo-location from the client device used to select the game title and identifies a data center that is geographically close to the client device and signals the data center to load the game code and the save data. The geo-location of the user is determined using a global positioning system (GPS) mechanism within the client device, the client's Internet Protocol (IP) address, and/or the client's ping information. Identification of a data center that is close to the client device minimizes latency during user interaction with the game. In some embodiments, the identified data center does not have a bandwidth/ capacity to host the game or is overused. In these embodiments, the game hosting system identifies another data center that is geographically close to the client device. The loading of the game includes loading game code of a game for which the title is selected by the user via the client device, loading save data for the game, and executing an instance of the game.

In response to receiving the signal from the game hosting system, a controller within the identified data center selects the game server at the data center and a save data processor at the data center to instantiate the game on the server. The game server includes one or more game consoles and the controller determines which one of the plurality of game consoles to use to load the game. A game console is similar to an independent game console, or is a rack-mounted server or a blade server. The blade server, in some embodiments, includes a plurality of server blades with each server blade having circuitry for instantiating a single dedicated application, such as the game. Of course, the game console described above is exemplary and should not be considered restrictive. In some embodiments, other types of game consoles, including game stations, etc., are engaged for hosting the identified game.

Once the game console is identified, the game code for the game is loaded onto the game console. The game code is executed to apply the save data to generate one or more image frames of a game title, and a signal is sent to the client device via the game hosting system and the computer network identifying the game console on which the game is instantiated. The one or more image frames are streamed via the computer network to the client device to be displayed on the client device.

These operations form technical operations requiring multiple servers and/or execution platforms to enable quick access to databases and presentation of content to remotely located client devices. In some embodiments, cloud gaming also includes the operations of compression utilizing any number compression techniques. The compression techniques uses encoders, which would then allow decoders on client devices to access and play a game. In various embodiments, management of several games and distribution includes a number of data centers, direction servers, quality of service testers, direction and redirection to lower latency data centers, and management of the instant play demos. It should also be understood that these operations and tasks will utilize special purpose computers that are designed for streaming and low latency due to the remote execution of games, and the delivery to the client devices.

Figures 1, 1C:
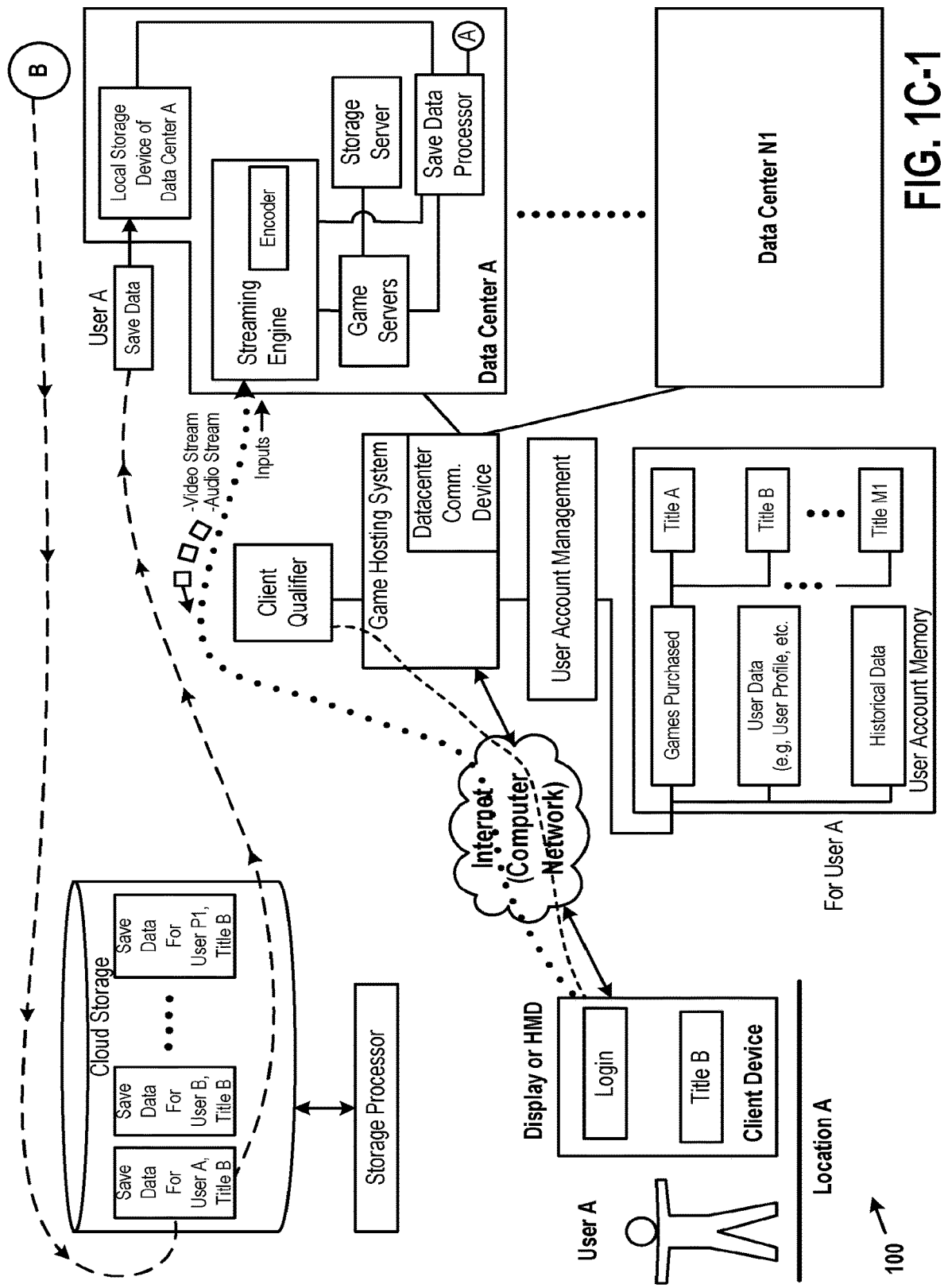
Figures 1, 1C, 2:
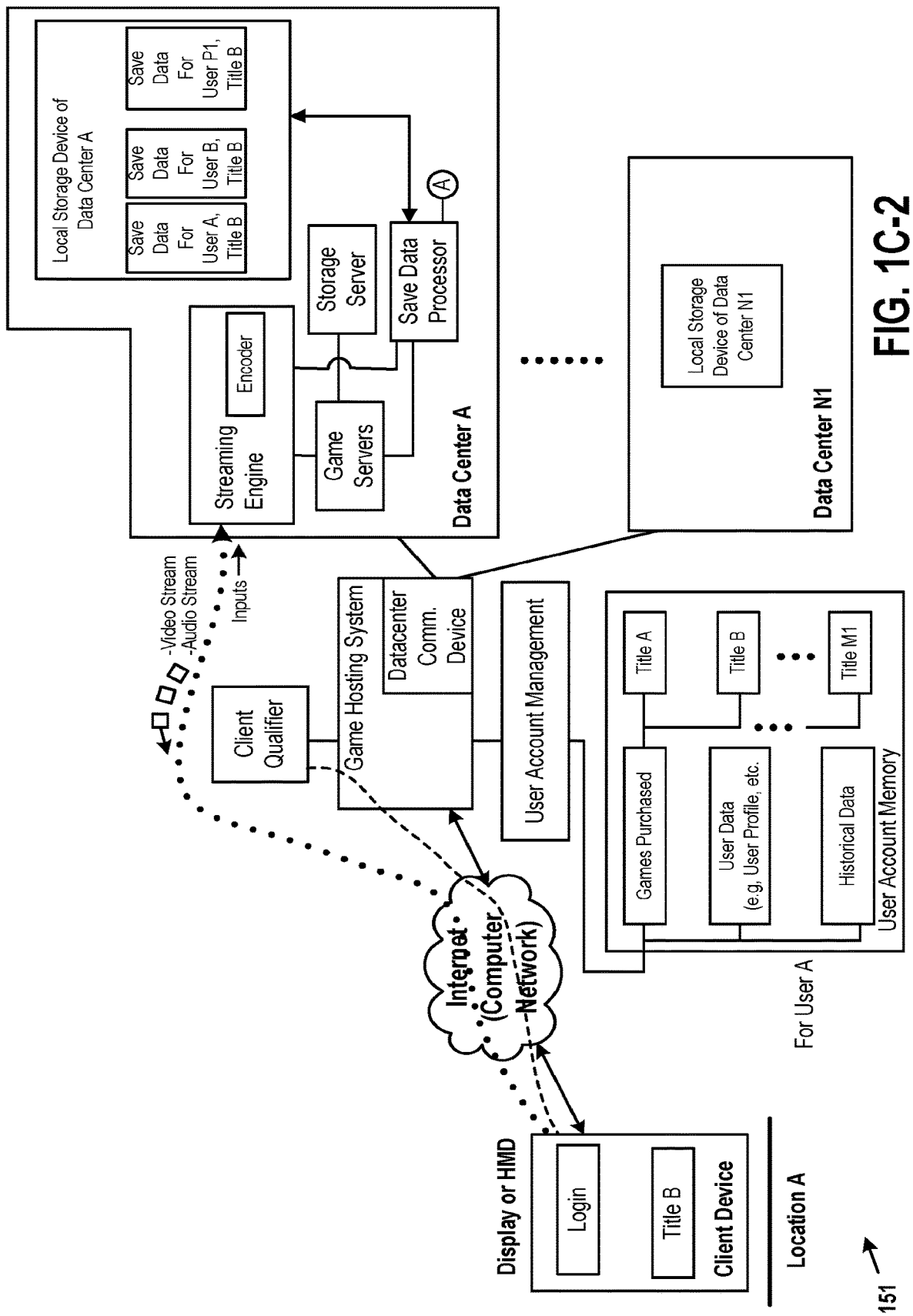

FIG. 1C-1 is a diagram of a system 100 to illustrate updating of save data within the data center A from a cloud storage. The system 100 includes the client device that is connected to the computer network, e.g., the Internet, an Intranet, a combination of the Internet and an Intranet, a wide area network, a local area network, a combination of wide area network and local area network, etc. Examples of the client device include a desktop, a laptop, a head mounted display (HMD), a game console, a combination of the game console and the HMD, a smart phone, a tablet, a television, or a device capable of electronically displaying information to a user, etc. The system 100 further includes the game hosting system, which is connected to a datacenter communication device, a client qualifier, and the user account management. In some embodiments, a communication device is a network device, e.g., a transceiver, etc., that generates and communicates data packets to one or more data centers via a computer network. For example, the datacenter communication device generates and sends data packets to the data center A via a computer network, and generates and sends data packets to the data center B via another computer network. In various embodiments, the datacenter communication device generates, and sends data packets to the data centers A and B via one computer network. In several embodiments, the datacenter communication device receives from a processor of the game hosting system a command whether save data of a game that is identified by a Title is to be streamed to the client device from the data center A or the data center B or the datacenter N1. Upon receiving the indication, the datacenter communication device generates one or more packets including the command and sends the command to the data center A or the data center B or the datacenter N1 that is to stream save data of a game to the client device. In various embodiments, each of the game hosting system, the client qualifier, and the user account management is one or more processors, or one or more processors coupled with one or more memory devices. In some embodiments, a processor, as used herein, is an application specific integrated circuit (ASIC), a programmable logic device (PLD), a microcontroller, a controller, a central processing unit (CPU), a microprocessor, etc.

The system 100 further includes any number of data centers, e.g., data centers B thru N1, etc., where N1 is an integer greater than zero. In some embodiments, a data center is a facility, e.g., a building, a server room, a computer room, etc., used to house servers and telecommunication components, e.g., routers, communication devices, etc., and power supplies that power the servers and the telecommunication components. The system 100 also includes the cloud storage and the user account memory device. In several embodiments, the cloud storage spans multiple storage servers located in a facility, and the facility having the cloud storage is usually owned and managed by a hosting entity, e.g., a corporation, a private entity, a partnership, etc. People or organizations, e.g., corporations, partnerships, etc., buy or lease storage capacity from the hosting entity to store application data, the user data, or save data, which is further described below. Services offered by the cloud storage are accessed by the client device via a web service application programming interface (API). In some embodiments, a memory device includes a random access memory (RAM), a read-only memory (ROM), or a combination of RAM and ROM. For example, a memory device includes a flash memory, a redundant array of storage disks, a hard disk, a magnetic memory, etc.

In various embodiments, the cloud storage is owned, e.g., bought, etc., and operated, e.g., managed, repaired, cleaned, etc., by an entity that is different from an entity that owns the data centers A thru N1 or that leases floor space to operate machines, e.g., servers, memory devices, processors, telecommunication components, communication devices, etc., within the data centers A thru N1 or that leases the machines within the data centers A thru N1. For example, the cloud storage is owned by a corporation and each of the data centers A thru N1 are owned by another corporation. As another example, the cloud storage is owned by a corporation and servers and storage devices of the data centers A thru N1 are leased or owned by another corporation. As yet another example, the cloud storage is owned by a corporation and space within one or more of the data centers A thru N1 is leased by another corporation for placing machines owned by the other entity. In various embodiments, a storage device is a memory device. In several embodiments, a data center includes any number of servers and any number of local storage devices.

In some embodiments, the cloud storage includes servers for storing save data but not for processing data regarding inputs received from the user A via the client device. For example, the servers of the cloud storage cannot process the input data received from the client device to modify the save data to generate a next state, e.g., next virtual environment, etc., in a game. There is no game code stored in the cloud storage for processing the input data. In some embodiments, a virtual environment and a game scene are terms used interchangeably herein. Examples of the input data include a selection made by a user during play of a game, or a gesture made by the user during play of the game, etc. The selection is made by using a game controller and the gesture is made using the game controller and/or a body part of the user, and the gesture is captured using a camera at the location A of the client device. Moreover, in these embodiments, a data center includes game servers that process the input data to update the save data to generate image frames for the next state in a game. The image frames that represent the next state are stored in one or more storage servers of a data center. The storage servers also store game codes for one or more games and the game codes are executed by one or more game servers of the data center based on the input data to generate the image frames for the next state in a game. The image frames representing the next state are streamed from a streaming engine, e.g., a communication device and a decoder and an encoder, etc., of a data center via the computer network to the client device for display of the next state on a display device of the client device. For example, the image frames for displaying the next state are encoded, e.g., is compressed, etc., by the encoder of the data center to generate encoded data and the encoded data is packetized into one or more packets by the communication device of a data center to generate a video stream, or an audio stream, or a combination of an audio stream and a video stream, etc., and sent via the computer network to the client device. A communication device of the client device depacketizes the one or more packets to retrieve the encoded data for generating the next state from the one or more packets, and is then decoded by a decoder of the client device to retrieve the image frames for generating the next state. The image frames for generating the next state are displayed by the processor of the client device to display the next state on the display device of the client device. Examples of the display device include a liquid crystal display (LCD), a light emitting diode display (LED), a plasma display, etc.

The user account memory device stores Titles A, B, thru M1 purchased by the user A, where M1 is an integer equal to or greater than zero. The user account memory device further includes user data, which is data regarding a user. For example, the user data includes the user login information, or profile information regarding the user, or an image of the user, or biometric information regarding the user, or a combination thereof, etc. In some embodiments, the user data is information that identifies the user and distinguishes the user from other users. The user account memory device includes historical data regarding a user. For example, the user account memory device includes data regarding a number of times a game is accessed by a user after logging into a user account assigned to the user, an amount of time for which a game is played by a user after logging into the user account, a location of the user during play of the game, etc.

The client device includes a transceiver that communicates with a location determination system to determine a location of the client device. For example, the client device includes a global positioning transceiver that communicates with a number of satellites to calculate a geo-location of a user operating the client device. The global positioning transceiver and the satellites form a GPS. As another example, the client device includes a transceiver that communicates signals with a number of cell phone towers to determine a location of a user operating the client device.

The user A logs into a user account assigned to the user via the client device. For example, the user A logs into the user account after the user login information is authenticated by the game hosting system. In some embodiments, a user account of a user is accessed by the user after the user login information, e.g., biometric data assigned to the user, or a user name assigned to the user, or a user password assigned to the user, or a combination thereof, etc., is authenticated by the game hosting system. The game hosting system allows access to a user to play a game after the user login information is authenticated by the game hosting system.

When the user A accesses his/her user account after the user login information is authenticated, the game hosting system provides access to titles, e.g., a Title B, etc., of games that are purchased by the user A and the titles are displayed on the display screen of the client device for the user A to access. For example, the game hosting system receives the user login information via the computer network from the client device and provides the user login information to the user account management. The user account management identifies from the user account memory device a user profile of the user A. Login information stored within the user profile is matched to the user login information by the user account management for the authentication to occur. Moreover, when the authentication occurs, any titles that are purchased via the user account of the user A are accessed by the user account management and provided to the game hosting system. An indication of the authentication and the titles purchased by the user A after logging into his/her user account are provided by the user account management to the game hosting system and the game hosting system sends one or more signals via the computer network to the client device indicating that the user login information is authenticated and providing the titles for display on the display device of the client device. Moreover, the user A is at the location A when the user A accesses his/her user account. The location A is determined by the client device in a manner described above.

When the Title B is displayed on the display device of the client device, the user A selects via an input device, e.g., or the game controller, the body part of the user, or a combination thereof, etc., the Title B to initiate the game session. The camera captures the gesture performed by the user A using his/her body part and/or the game controller to select the Title B, and provides an indication of performance of the gesture to a processor of the client device. In some embodiments, the processor of the client device receives an input signal from the game controller indicating the selection of the Title B. Upon receiving the indication of the selection of the Title B or of the performance of the gesture, the processor of the client device parses the indication to determine that the user A has selected the Title B. For example, the processor of the client device identifies from images of gestures stored in a memory device of the client device that the gesture performed by the user A is for selecting the Title B.

The processor of the client device sends a signal indicating that the user A has selected the Title B to a communication device of the client device. The processor of the client device is connected to the communication device of the client device. Examples of a communication device, as used herein, include a network interface controller, a network interface card, an Ethernet card, etc. The communication device of the client device applies a communication protocol, e.g., a transmission control protocol over Internet protocol (TCP/IP), an Ethernet protocol over IP protocol, etc., to generate one or more packets that include the indication of the selection of the Title B and sends the one or more packets via the computer network to the game hosting system. A communication device of the game hosting system applies the communication protocol to the one or more packets to disintegrate the one or more packets to further generate the indication of the selection of the Title B, and provides the indication of the selection of the Title B to the processor of the game hosting system. The processor of the game hosting system is connected to the communication device of the game hosting system.

The processor of the game hosting system provides the indication of the selection of the Title B to a processor of the client qualifier. The client qualifier determines whether the client device is qualified to receive data from a data center. Moreover, the processor of the game hosting system determines, e.g., identifies, etc., whether the data center A or another data center, e.g., the data center N1, is suitable for streaming save data for the game identified by the Title B to the client device via the computer network. For example, the processor of the game hosting system sends, via the datacenter communication device, a query to the data center A and to the data center N1 to determine which of the data centers A or N1 has a higher bandwidth for streaming the save data to the client device via the computer network. The bandwidth is a function of loads handled by the data centers A and N1. To illustrate, when the streaming engine of the data center A is transferring video and/or audio data to a larger number of client devices at the same time compared to the data center N1, the bandwidth of the data center A will be lower than the bandwidth of the data center N1. Upon determining that the data center A has the higher bandwidth, the data center A is selected by the processor of the game hosting system as being the suitable data center. As yet another example, the processor of the game hosting system receives a GPS signal indicating a geo-location of the data center A from a GPS transceiver within the data center A, a GPS signal indicating a geo-location of the data center N1 from a GPS transceiver within the data center N1, and a GPS signal indicating a geo-location of the client device from the GPS transceiver within the client device at the location A. Based on the geo-locations, the processor of the game hosting system determines a distance between the data center A and the client device and a distance between the data center N1 and the client device. The processor of the game hosting system determines that the distance between the client device and the data center A is less than the distance between the data center N1 and the client device, and selects the data center A to be the suitable data center. In some embodiments, both the loads and the distances are used to determine the suitable data center. In various embodiments, a quality of service (QoS) protocol is applied to determine the suitable data center. For example, the QoS protocol includes the loads, the distances, and other parameters to determine the suitable data center.

The data centers A through N1 are connected to the game hosting system. For example, communication devices of each of the data centers A through N1 are connected to the game hosting system via the datacenter communication device. As another example, when the game hosting system, the client qualifier, the user account management, and the user account memory device are located within the data center A, the communication device of the data center A is connected to the communication devices of the data centers B through N1. To further illustrate, the game hosting system, the client qualifier, the user account management, and the user account memory device are located within a data center, e.g., within the data center A, or within the data center N1, etc. In this illustration, the game hosting system and the client qualifier do not use the datacenter communication device to communicate with the data center in which the game hosting system, the client qualifier, the user account management, and the user account memory device are located. In these embodiments, the game hosting system and the client qualifier use a parallel data transfer protocol, or a serial data transfer protocol, or a universal serial bus (USB) protocol to communication with the data center. In several embodiments, functions, described herein, as being performed by the client qualifier, the game hosting system, and the user account management are implemented within one or more processors or within one or more servers.

The processor of the game hosting system determines that the data center A is the suitable data center and sends a command via the communication device of the data center A to the data center A to stream image frames for the game identified by the Title B and for the user A to the client device. Upon receiving the command from the processor of the game hosting system via the communication device of the data center A, the game server of the data center A provides the command to the save data processor of the data center A. Upon receiving the command, the save data processor executes an operation 172 of a method 170 that is described below with respect to FIG. 1D.

As an example, the save data is metadata for creating a virtual environment of a game having the Title B. Other examples of save data for a game played by a user via a user account include a number of points accumulated in the game by the user after logging into the user account, data for creating a background of a game scene specific to the play of the game by the user, social data communicated by or received by the user while playing the game after logging into the user account, a level achieved by the user in the game after logging into the user account, a number of virtual objects accumulated by the user while playing the game after logging into the user account, data for creating a virtual object created by the user during the play of the game, etc. Examples of the virtual objects include avatars, points, stars, virtual items, virtual awards, virtual rewards, etc. Examples of background of a game scene include one or more virtual objects that are not controllable by the user via the client device. For example, virtual trees in a background of a game scene cannot be moved or leaves of the trees cannot be moved by the user via the client device. In some embodiments, the social data includes logs of information, e.g., chat information, logs of voice information, logs of video information, etc., that a user communicates with, e.g., sends to or receives from, etc., his/her social network friends. In various embodiments, the social network friends of a user are people that the user communicates with after the user logs into his/her user account and after the friends log into their corresponding user accounts. Examples of the data for creating the background of the game scene include a color of the background, a texture to the background, a location of the background within the game scene, a shading of the background, a size of the background, etc. Examples of the data for creating the virtual object include a color of the virtual object, a texture to the virtual object, a location of the virtual object within the game scene, a shading of the virtual object, a size of the virtual object, etc.

It should be noted that in some embodiments, the save data for the user A and the game identified by the Title B is different from save data for a user B and the game identified by the Title B. For example, in a game that is identified by a title "Unchartered", the user A plays the game using the client device and stops playing the game until the user A reaches a point in the game where a virtual avatar needs to cross a river to reach to a next level in the game. The user B plays the game using another client device and stops playing the game until the user B reaches a point in the game where the virtual avatar needs to climb a bridge to reach a next level in the game. A storage processor stores in the cloud storage for the user A and the game having the Title B, data for generating a game environment that includes the river and other virtual objects, e.g., trees, animals, rocks, etc., that surround the river. The storage processor stores in the cloud storage for the user B and the game having the Title B, data for generating a game environment that includes the bridge and other virtual objects, e.g., a valley under the bridge, ropes, other avatars, etc., that surround the bridge. The cloud storage stores the save data for the user B and for the game identified by the Title B in addition to the save data for the user A and for the game identified by the Title B. The storage processor stores in the cloud storage for any number of users, e.g., user P1, etc., save data for the Title B.

In several embodiments, the save data for the user A and for the game identified by the Title B is the same as the save data for a user B and for the game identified by the Title B.

FIG. 1C-2 is a diagram of an embodiment of a system 151 in which each of the data centers A through N1 is associated has a corresponding local storage device. For example, the data center A has the local storage device. To illustrate, all equipment within the data center A is owned by the same entity. As another illustration, the save data processor accesses the save data from the local storage device without accessing the save data from the cloud storage via the computer network. Examples of the equipment of the data center A include the game servers of the data center A, the storage servers of the data center A, the streaming engine of the data center A, the local storage device of the data center A, and the save data processor of the data center A. As another example, the data center N1 includes its own local data storage for storing save data associated with game titles stored within the data center N1.

FIG. 1D is a flowchart of an embodiment of the method 170 for illustrating access of save data from the cloud storage by the data center A and use of the save data for playing the game identified by the Title B. The method 170 is executed by the data center A. In the operation 172 of the method 170, the save data processor determines whether the save data for the game identified by the Title B is stored within the local storage device, e.g., a memory device, etc., of the data center A. For example, the save data processor reads contents, e.g., file names, etc., stored in the local storage device of the data center A to determine whether the save data for the Title B is stored within the local storage device of the data center A. The save data processor determines that the save data for the Title B is stored in the local storage device of the data center A upon determining that one or more file names having the Title B are identified as being stored within the local storage device of the data center A. Upon determining that the save data is not stored within the local storage device of the data center A, the save data processor sends a signal to the communication device of the data center A to communicate with the cloud storage for downloading, in an operation 174, the save data from the cloud storage to the data center A. The communication device of the data center A generates one or more packets including a request for providing the save data and sends the one or more packets via the computer network to a communication device of the cloud storage. The communication device of the cloud storage applies the communication protocol to the one or more packets to retrieve the request for providing the save data and sends the request to the storage processor of the cloud storage. The request includes the Title B and information identifying the user A, e.g., the user profile information, the user login information, etc.

Upon receiving the request, the storage processor of the cloud storage identifies the save data for the game identified by the Title B and for the user A. For example, the storage processor of the cloud storage determines that there is a match between the Title B within the request and the Title B as stored in a memory device of the cloud storage and further determines whether there is a match between the information identifying the user A and the information identifying the user A as stored within the memory device. Upon determining that the matches occur, the storage processor of the cloud storage obtains the save data mapped with the Title B and with the information identifying the user A from the memory device of the cloud storage and provides the save data to the communication device of the cloud storage. The communication device of the cloud storage generates one or more packets including the save data and sends the one or more packets via the computer network to the communication device of the data center A. The communication device of the data center A applies the communication protocol to the one or more packets received from the cloud storage to retrieve the save data for the user A and the Title B. The save data is provided by the communication device of the data center A to the save data processor and the save data processor stores the save data in the local storage of the data center A.

In an operation 182 of the method 170, the game server of the data center A generates one or more image frames for the Title B from the save data that is stored in the local storage of the data center A and provides the one or more image frames for the Title B to the streaming engine of the data center A. For example, the game server generates an image frame by parsing one or more save data files that store a location of a virtual object in the image frame, and placing the virtual object in the image frame. The game server generates the image frame by parsing the one or more save data files that store attributes of the virtual object that are specific to the play of the game by the user A and applying the attributes to the virtual object in the image frame. The game server generates the image frame by parsing the one or more save data files to obtain a location of a background within the image frame and placing the background at the location in the image frame. The location of the background in the image frame is mapped to the play of the game by the user A and is different from a location of the background that is mapped to the play of the game by another user. Also, the game server generates the image frame by parsing the one or more save data files to obtain other attributes regarding the background specific to the play of the game by the user A and applying the other attributes to the background in the image frame.

The encoder of the streaming engine of the data center A encodes the one or more image frames to generate encoded data and the streaming engine further generates one or more packets from the encoded data to generate a stream, e.g., one or more packets, a video stream, etc., of encoded data. The stream of encoded data is sent from the streaming engine via the computer network to the communication device of the client device. Moreover, the communication device of the client device applies the communication protocol to the stream of encoded data to extract the encoded data, and the encoded data is decoded by the decoder of the client device to obtain the one or more image frames. The one or more image frames are displayed by the processor of the client device, during the game session, on the display device of the client device. During the game session, after viewing the one or more image frames, the user provides an input via the input device to the client device to start playing the game having the Tile B, and the input is sent from the client device via the computer network to the game hosting system.

Upon determining that the save data for the Title B is available within the local storage of the data center A, in an operation 176, the save data processor determines whether a refresh for the Title B is to be performed based on changes to the save data that occur after accessing the save data from the data center B. For example, after the data center A accesses the save data from the cloud storage but before the user accesses the one or more image frames generated based on the save data from the data center A, the user uses the client device to play the Title B while accessing the one or more image frames for the Title B from the data center B. Additional information regarding the save data is generated during the access of the save data for the Title B from the data center B. An example of the additional information includes information within an image frame that is customized by the user by using the client device or the input device. To illustrate, the additional information includes a virtual object that is modified by the user by using a color or a texture or a shape that is identified in the save data. As another illustration, the user uses the client device and/or the input device to change an attribute of an avatar within a game or an attribute of a background within the game or to change a score in the game or to win a trophy in the game. The additional information in an image frame is additional to preliminary information within the image frame. The preliminary information within the image frame is a part of the image frame that is available to all users when they first access the game and the preliminary information is generated from a game code. There is no customization of the preliminary information. Examples of the preliminary information that is not customized include a virtual object that is not customized with the save data, a background that is not customized with the save data, a score of zero, etc. The save data changes as the user plays the game. For example, as the user provides inputs to build a building in the game, a shape of the building changes. As another example, as the user provides inputs to build a virtual object in the game, a graphical property, e.g., shape, color, texture, etc., of the virtual object changes. The inputs received from the user via the client device are communicated from the client device operated by the user via the computer network to the data center B, and a game processor of the data center B modifies the save data stored within a local storage of the data center B to implement the changes to the save data based on the inputs. After the user finishes playing the game having the Title B, the data center B stores the changes in the save data for the game having the Title B in the local storage of the data center B. A communication device of the data center B communicates the changes to the save data stored in the data center B via the computer network to the cloud storage for storage. Then after the changes to the save data are stored in the cloud storage, the user accesses the Title B from the data center A. In the data center A, the save data is stored but the changes to the save data that occurred when the user accessed the one or more image frames for the Title B from the data center B are not stored. The communication device of the data center A sends a request to the storage processor of the cloud storage via the communication device of the cloud storage to inquire whether there are any changes in the save data that occurred after accessing the save data from the data center A.

Upon receiving an indication from the storage processor of the cloud storage that the changes in the save data occurred after accessing the save data from the data center A, in an operation 180 of the method 170, the communication device of the data center A downloads the changes to the save data from the cloud storage. For example, the communication device of the data center A sends a request to the storage processor of the cloud storage to send the changes to the data center A. The storage processor accesses the changes to the save data from a memory device of the cloud storage and sends the changes via the communication device of the cloud storage and the computer network to the communication device of the data center A. In the operation 182, the streaming engine of the data center A generates one or more packets after encoding one or more image frames generated from the save data for the Title B and from the changes to the save data that occurred after accessing the save data from the data center A, and streams the one or more packets via the computer network to the client device for display of the one or more image frames on the display device of the client device. The one or more image frames are generated from the changes to the save data and from the save data by the game server of the data center A. In the operation 182, the game having the Title B is played using the one or more image frames displayed on the display device of the client device.

Also, during the game session in which one or more image frames generated from the save data are received by the client device from the data center A, in some embodiments, there is a change in the save data. For example, the user provides an input to accumulate more points during the game having the Title B, or to create new virtual objects, or to communicate with his/her social network friends, or to pass a level in the game, or a combination thereof, or to post a video of himself/herself playing the game, etc.

In various embodiments, the user provides an input to the game via the input device to change the save data. For example, the user makes a selection using a gesture so that the save data indicates mining of a file or an increase in height of a tall tower. The input during the game session is packetized with an identification of the game having the Title B, and sent from the communication device of the client device via the computer network to the communication device of the game hosting system. The communication device of the game hosting system depacketizes the input and the identification of the game, and provides the input and the identification to the processor of the game hosting system. The processor of the game hosting system determines that the input is for the game having the Title B from a match between the identification received from the client device and an identification of the game in the user account memory device. The processor of the game hosting system sends the input to the game server of the data center A via the datacenter communication device and the communication device of the game hosting system. The game server of the data center A applies a game code of the game having the Title B to the save data and the input to determine a change in the save data. For example, the game server determines that a selection by the user of a virtual first aid kit increases a virtual health of an avatar in the game and changes the save data to display an increased amount of health of the user in an environment of the game displayed on the client device. As another example, the game server determines that a selection by the user to stay on a virtual rock kills an avatar in the game having the Title B and changes the save data to display an environment in which the avatar is shown to be dead. The changes to the save data that occur during the play of the game is provided by the game server of the data center A to the save data processor of the data center A and the save data processor writes the change to the save data to the local storage device of the data center A.

In an operation 184 of the method 170, it is determined by the save data processor whether the game session for the game having the Title B has ended. For example, the game session ends when the user uses the input device to select an option displayed on the display device of the client device to quit the game having the Title B. As another example, the game session ends when there is a loss of communication between the client device and the data center A. As yet another example, the game session ends when the user powers off the client device. An indication of the end of the game session is sent from the processor of the client device via the communication device of the client device, the computer network, and the communication device of the game hosting system to the processor of the game hosting system. The processor of the game hosting system sends via the datacenter communication device and the communication device of the data center A the indication to the save data processor of the data center A.

Upon determining that the game session has ended, the communication device of the data center A, in an operation 186 of the method 170, uploads, e.g., transfers, etc., to the cloud storage via the computer network any changes to the save data that occur during the play of the game while the save data is accessed from the data center A. For example, the save data processor receives the indication from the client device via the communication device of the client device, the computer network, the datacenter communication device, and the communication device of the data center A that the game session has ended and sends the changes to the save data that occur during the game session to the communication device of the data center A. The communication device of the data center A packetizes the changes to the save data and sends one or more packets via the computer network to the communication device of the cloud storage. The communication device of the cloud storage applies the communication protocol to depacketize the one or more packets to obtain the changes to the save data and provides the changes to the storage processor of the cloud storage. The storage processor of the cloud storage stores the changes to the save data in the memory device of the cloud storage. For example, the storage processor of the cloud storage stores a mapping between the changes to the save data and the user account of the user A and the game having the Title B within the memory device and stores the changes to the save data within the memory device.

In various embodiments, the local data storage of the data center A is used to save the changes to the save data. For example, as illustrated in FIG. 1B above, there is no cloud storage with which the data center A communicates. Rather, upon determining that the game session has ended, the save data processor of the data center A stores the changes to the save data that occur during the play of the game having the Title B in the local data storage of the data center A. There is no transmission of the changes to the save data to the cloud storage via the computer network.

In some embodiments, during an additional session for playing the game having the Title B, which occurs after the game session, the method 170 is repeated. For example, after the user A quits the game having the Title B and then selects the Title B again for game play, the save data for the Title B and changes in the save data for the Title B continue to be stored for a pre-determined amount of time in the local storage device of the data center A. The user A re-starts the additional session from the location A after quitting the game having the Title B, logging out of his/her user account, then logging back into the user account and selecting the Title B. In some embodiments, the user A re-starts the additional session after quitting the game having the Title B and then selecting the Title B without logging out of his/her user account. The user A logs out of his/her user account by selecting via the input device a power off option displayed on the display device of the client device or by selecting a power off button on the client device. The user A logs back into his/her user account by selecting a power on button on the client device or on the input device and after the user login information is authenticated by the game hosting system. During the additional session, latency in transferring the save data from the cloud storage to the data center A via the computer network is reduced and throughput in the transfer of one or more image frames from the data center A to the client device via the computer network is increased when there is no need to transfer the save data from the cloud storage to the data center A. Between the game session and the additional session for playing the game having the Title B, the save data and the changes to the save data that occur during the game session are stored in the local storage of the data center A. As a result, the operations 172, 176, 178, and 182 are performed and the operation 174 is not performed during the additional session to reduce the latency of transferring the save data from the cloud storage to the data center A, and increase the throughput of transferring one or more image frames from the data center A to the client device.

In some embodiments, the cloud storage receives the changes to the save data from the data center A and sends the changes via the communication device of the cloud storage to additional other cloud storages that are owned by the entity that owns the cloud storage. In this manner, the same save data is stored in all the cloud storages that are owned by the entity.

In various embodiments, during execution of the operations 172, 174, 176, 178, and 180, and before the operation 182 is performed, the save data processor sends via the streaming engine and the computer network display data indicating that the game having the Title B is being downloaded to the client device. For example, the save data processor sends the display data to the streaming engine. The streaming engine applies the communication protocol to the display data to generate one or more packets and sends the one or more packets via the computer network to the communication device of the client device. The communication device of the client device applies the communication protocol to depacketize the one or more packets to extract the display data and provides the display data to the processor of the client device. The processor of the client device displays on the display device the indication that the game having the Title B is being downloaded to the client device.

FIG. 2 is a flowchart of an embodiment of a method 200 to illustrate background downloading of save data for an additional game title, other than Title B, after the Title B is selected for game play for the game session. The method 200 is performed by the data center A. The method 200 includes the operations 172, 174, 176, and 180 of the method 170 of FIG. 1D. Upon performing the operation 174 of downloading the save data for the game identified by the Title B, the save data processor of the data center A determines, in an operation 202 of the method 200, whether the additional game title, e.g., the Title A, a Title C, etc., is purchased by the user A via the client device. For example, the additional title for an additional game is purchased when the user A provides his/her credit card or debit card information via the input device after selecting the additional title displayed on the client device and selects an option to purchase the additional title displayed on the display device of the client device. As another example, the additional title for the additional game is purchased when the user A selects the additional title displayed on the client device and selects an option to purchase, for free, the additional title displayed on the display device of the client device. In some embodiments, the additional title is of a game different from the game having the Title B. For example, the additional title is of a tank war game and the Title B is of an adventure game. As another example, the additional title is of a zombie game and the Title B is of a car racing game. The selection of the option to purchase the additional title is sent from the communication device of the client device via the computer network to the game hosting system. The game hosting system provides the indication of the selection to the data center A. For example, the processor of the game hosting system sends the indication of the selection to the save data processor of the data center A.

Upon receiving the indication of the selection of the additional title, in the operation 202, the save data processor determines whether save data for the additional title is stored in the local storage of the data center A. The operation 202 is performed in the same manner as that of performing the operation 172 for determining whether the save data for the Title B is available in the local storage of the data center A except that the operation 202 is performed for the additional title. Upon determining that the save data for the additional title is stored in the local storage of the data center A, in an operation 204 of the method 200, the save data processor determines whether a refresh for the additional title is to be performed. The operation 204 is performed in the same manner as that of performing the operation 176 for the Title B except that the operation 204 is performed for the additional title. Upon determining that the refresh is to be performed for the additional title, the save data processor determines to download a change in the save data for the additional title in an operation 206. The change in the save data for the additional title is downloaded in the same manner as that of performing the operation 180 of downloading the change in the save data for the Title B except that the operation 206 is performed for the additional title. The operations 184 and 186 of FIG. 1D are performed after performing the operation 206. In some embodiments, after performing the operations 206, 184 and 186, the user selects the additional title for an additional game session for playing the game identified by the additional title.

Upon determining that the save data for the additional title is not available in the local storage of the data center A, in an operation 208, the save data processor determines to download the save data for the additional title from the cloud storage to the local storage of the data center A. The operation 208 is performed in the same manner as that of the performing the operation 174 of the method 170 of FIG. 1D except that the operation 208 is performed for the save data for the additional title instead of for the save data for the Title B. The operations 184 and 186 of FIG. 1D are performed after performing the operation 208.

In various embodiments, the operation 182, described in FIG. 1D, of starting the game session of playing the game having the Title B is performed while one or more of the operations 202, 204, 206, and 208 are being performed.

In some embodiments, the operation 184, in FIG. 1D, of determining whether the game session of playing the game having the Title B has ended is performed while one or more of the operations 202, 204, 206, and 208 are performed.

FIG. 3A is a flowchart of an embodiment of a method 300 for determining whether the user A will play a title and if so, downloading save data for the title before the user requests the title for game play. The method 300 is executed by the data center A.

The method 300, in some embodiments, is executed after the operation 186 of uploading the save data to the cloud storage. For example, the method 300 is executed after the user A uses the client device to quit the game having the Title B or to log off from his/her user account. The user A logs off from his/her user account by using the input device to select a log off option displayed on the display device of the client device or by powering off the client device. The user A quits the game by using the input device to select a quit game option displayed on the display device of the client device.

In an operation 302 of the method 300, the save data processor of the data center A determines whether the game identified by the Title B is frequently played by the user A. For example, the save data processor sends a request to the game hosting system requesting a frequency of play of the game having the Title B. In this example, the user A plays the game by accessing the game from the data center B or the data center N1 but not the data center A. The game hosting system provides the frequency of game play of the game having the Title B to the save data processor. As another example, the user A plays the game by accessing the game having the Title B from the data center A and/or from any other data center.

The save data processor determines whether the frequency of game play is greater than a pre-determined threshold. For example, the save data processor determines that the game having the Title B is played for greater than a pre-determined amount of time each time the user A logged into the game hosting system to play one or more games. As another example, the save data processor determines that the Title B is selected by the user A for greater than a pre-determined number of times after logging into the game hosting system. As yet another example, the save data processor determines whether a total length of time for which the game having the Title B is played by the user A via his/her user account is less than a total length of time for which any other game is played by the user A via his/her user account.

Upon determining that the frequency of game play is greater than the pre-determined threshold, the save data processor determines, in an operation 304 of the method, a latest time at which the game having the Title B is played. For example, the save data processor sends a request to the game hosting system to provide the latest time at which the user A quit playing the game having the Title B. After the latest time, the user A has not played the game. As another example, the save data processor sends a request to the game hosting system to provide the latest time at which the user A started playing the game having the Title B. After the latest time, the user A has not played the game. In some embodiments, the user A starts playing a game when one or more image frames generated from save data for the game are streamed from a data center to the client device via the computer network for a first time after the user A logs into his/her user account. In various embodiments, the user A starts playing a game when after logging into his/her user account, one or more image frames generated from the save data for the game are streamed from a data center to the client device via the computer network for a first time and the user A provides via the input device an input for playing the game, e.g., for modifying the save data, etc. The game hosting system responds to the save data processor with the latest time at which the game having the Title B is played by the user A via his/her user account.

In an operation 306 of the method 300, the save data processor determines whether a current time is within a threshold period from the latest time at which the game having the Title B is played by the user A via his/her user account. For example, it is determined whether it has been a day or two days or a week or a pre-determined number of days or a pre-determined number of hours since the user A played the game having the Title B. The threshold period is determined based on the historical data. For example, the threshold period is a pre-determined portion of a day when the historical data indicates that the user A accesses the game having the Title B once every day. As another example, the threshold period is a pre-determined portion of the pre-determined number of hours when the historical data indicates that the user A accesses the game after the pre-determined number of hours. The historical data is accessed by the save data processor from the game hosting system. The game hosting system retrieves the historical data from the user account memory device and provides the historical data to the save data processor. The current time is determined by the save data processor from the Internet clock or by sending a request to the game hosting system for providing the current time. In case the request is sent, the game hosting system sends the current time to the save data processor. Upon determining that the current time is within the threshold period from the latest time, the operation 306 is followed by an operation described below with reference to FIG. 3B.

Upon determining that the game having the Title B is not frequently played by the user A via his/her user account in the operation 302, in an operation 308 of the method 300, the save data processor determines whether another game identified by another title, e.g., the Title A, a title other than the Title B, etc., is frequently played by the user A via his/her user account. The determination in the operation 308 is made in the same manner as that of making the determination, in the operation 302, of whether the game having the Title B is frequently played by the user A via his/her user account except that the determination in the operation 308 is made for the other title. Upon determining that the game having the other title is frequently played by the user A via his/her user account, all operations described in "X" are performed for the other title instead of for the Title B. Upon determining, in the operation 306 that the current time is not within the threshold period, the save processor keeps checking whether the current time is within the threshold period.

Figure 3B:
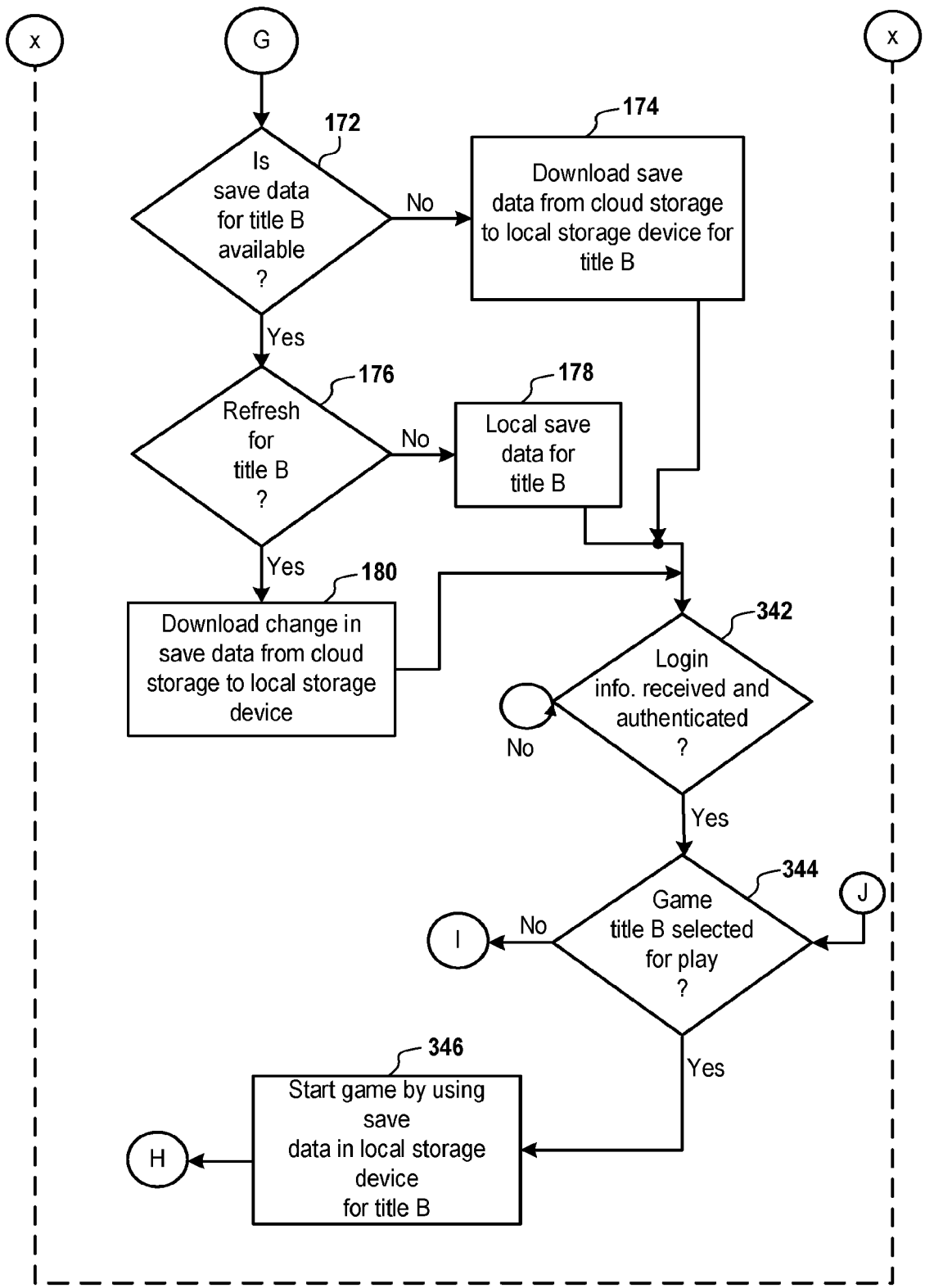
FIG. 3B is a continuation of the flowchart of FIG. 3A.

FIG. 3B is a continuation of the flowchart of the method 300 illustrated in FIG. 3A. Upon determining, in the operation 306 that the current time is within the threshold period from the latest time, the operations 172, 174, 176, 178, and 180 are performed. After the operation 174, or 178, or 180, in an operation 342 of the method 300, it is determined by the save data processor whether the user has logged into his/her user account after the authentication. For example, the save data processor sends a request to the game hosting system regarding whether the user A has logged into his/her user account. The game hosting system sends a response to the save data processor indicating whether the user A has logged into his/her user account.

Figure 3C:
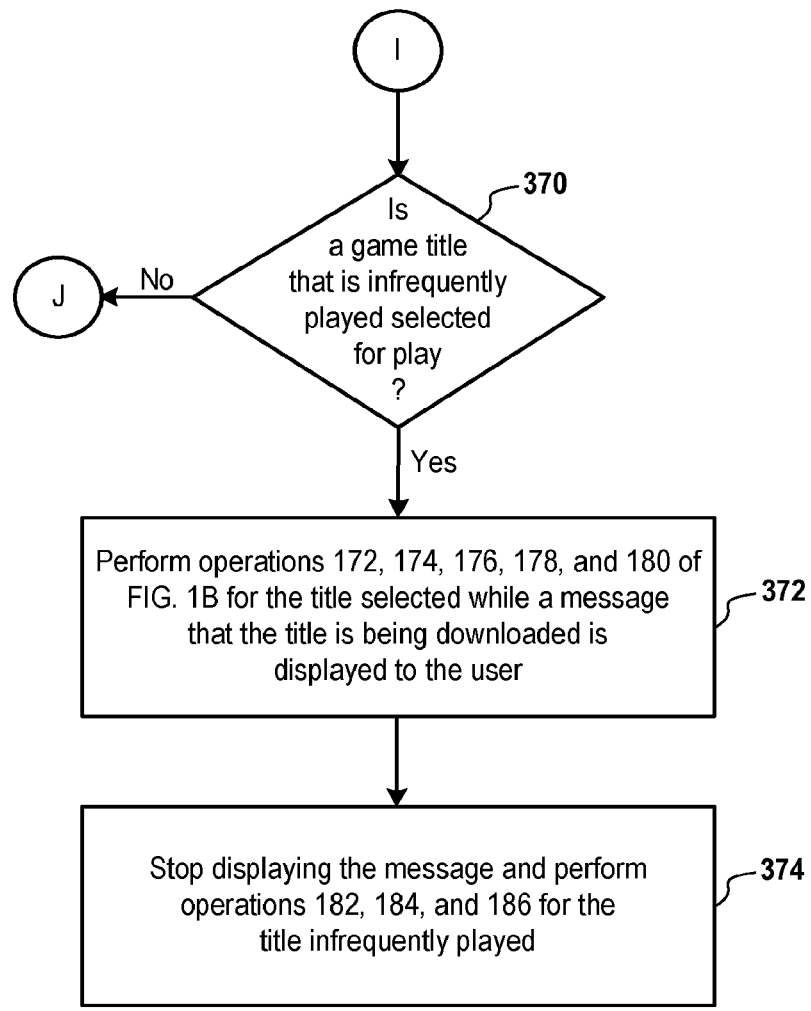
FIG. 3C is a continuation of the flowchart of FIG. 3B.

Upon determining that the user A has logged into his/her user account, the save data processor, in an operation 344 of the method 300, determines whether the Title B is selected by the user A via the client device for game play. The save data processor requests the game hosting system to provide an indication of a determination whether the Title B is selected for game play. Upon receiving the indication of the determination that the Title B is selected for game play, the save data processor determines that the game having the Title B is selected for game play. Upon determining that the Title B is not selected for game play, operations described below with reference to FIG. 3C are performed. On the other hand, upon determining that the Title B is selected for game play, the save data processor provides an indication of the determination to the game server of the data center A.

In an operation 346 of the method 300, the game server that receives the indication from the save data processor generates and sends a signal to the streaming engine to stream one or more image frames generated from the save data, downloaded in the operation 174 or determined to be available in the operation 172, or generated from the change in the save data downloaded in the operation 180, via the computer network to the client device for displaying the image frames on the display device of the client device. The user A starts playing the game having the Title B when the image frames are received by the client device via the computer network and displayed on the display device of the client device. There is very minimal wait time for the user A before playing the Title B after logging into his/her user account and selecting the Title B for game play. Wait time is reduced when based on the historical data, the save data for playing the game having the Title B is downloaded at the data center A or is determined to be available at the data center A, or the change in the save data is downloaded at the data center A before the user A logs into his/her user account for playing the game.

FIG. 3C is a continuation of the flowchart of FIG. 3B. In an operation 370 of the method 300, it is determined whether a title that is infrequently played is selected for play. For example, the save data processor sends a request to the game hosting system requesting a frequency of play of the Title A. In this example, the user A plays the game by accessing the game from the data center B or the data center N1 but not the data center A. The game hosting system provides the frequency of game play of the game having the Title A to the save data processor. As another example, the user A plays the game by accessing the Title A from the data center A and/or from any other data center.

The save data processor determines whether the frequency of game play is less than the pre-determined threshold. For example, the save data processor determines that the game having the Title A is played for less than the pre-determined amount of time each time the user A logged into the game hosting system to play one or more games. As another example, the save data processor determines that the Title A is selected by the user A for less than the pre-determined number of times after logging into the game hosting system. As yet another example, the save data processor determines whether a total length of time for which the game having the Title A is played by the user A via his/her user account is less than a total length of time for which any other game is played by the user A via his/her user account.

Upon determining that a title of a game that is infrequently played is not selected for play, the operation 344 is performed. On the other hand, upon determining that the a title that is infrequently played is selected for play, the save data processor determines, in an operation 372 of the method 300, to perform the operations 172, 174, 176, 178, and 180 for the game having the Title A while a message that the Title A is being downloaded is displayed on the display device of the client device. For example, the save data processor sends a signal to the game server to send the message via the streaming engine to the client device that the Title A is being downloaded. The streaming engine generates one or more packets having the message to the client device via the computer network. The client device upon receiving the message displays the message on the display device of the client device.

In an operation 374 of the method 300, after performing the operation 174, 178, or 180, the save data processor sends a command to the game server to indicate to the streaming engine to discontinue streaming the message and performs the operations 182, 184, and 186 for the Title A instead of the Title B. For example, the game server sends the command to the streaming engine, which discontinues sending the one or more packets that include the message via the computer network to the client device. Once the streaming engine discontinues sending the one or more packets, the client device discontinues displaying the message that the Title A is being downloaded.

It should be noted that in some embodiments, the operations described herein as performed by the save data processor are performed by the processor of the game hosting system. For example, with reference to FIGS. 3A, 3B, and 3C, the processor of the game hosting system performs the operations 302, 304, 306, and 308 instead of the save data processor. In this example, upon performing the operation 308, the processor of the game hosting system sends a signal to the save data processor of the data center A that the current time is within the threshold period from the latest time and upon receiving the signal, the save data processor performs the operations 172, 174, 176, 178, and 180. The save data processor provides an indication of performance of the operations 172, 174, 176, 178, and 180 to the game hosting system. Further, in the example, the game hosting system performs the operations 342 and 344 upon receiving the indication. As another example, the processor of the game hosting system performs the operation 370.

FIG. 4A is a flowchart of an embodiment of a method 400 to illustrate background downloading of a title that is frequently played when a game with another title that is frequently played is being played by the user A. In some embodiments, the method 400 is performed after the operation 186 (FIG. 1D). The method 400 is executed by the data center A. In an operation 402 of the method 400, it is determined by the save data processor of the data center A whether both titles B and C of two different games are frequently played by the user A. One or more embodiments of determining whether game having a title is frequently played by the user A are described above.

Upon determining that the both the games having the Titles B and C are frequently played by the user A, in an operation 404 of the method 400, the save data processor of the data center A determines a latest time at which the game having the Title B is played by the user A and a latest time at which the game having the Title C is played by the user A. One or more embodiments for determining a latest time at which a game having a title is played by the user A is described above.

In an operation 406 of the method 400, the save data processor of the data center A determines whether a current time is within the threshold period from the latest time at which the game having the Title B is played by the user A via his/her user account and from the latest time at which the game having the Title C is played by the user A via the user account. One or more embodiments for determining whether a current time is within the threshold period from the latest time at which a game is played by the user A are described above.

Figure 4B:
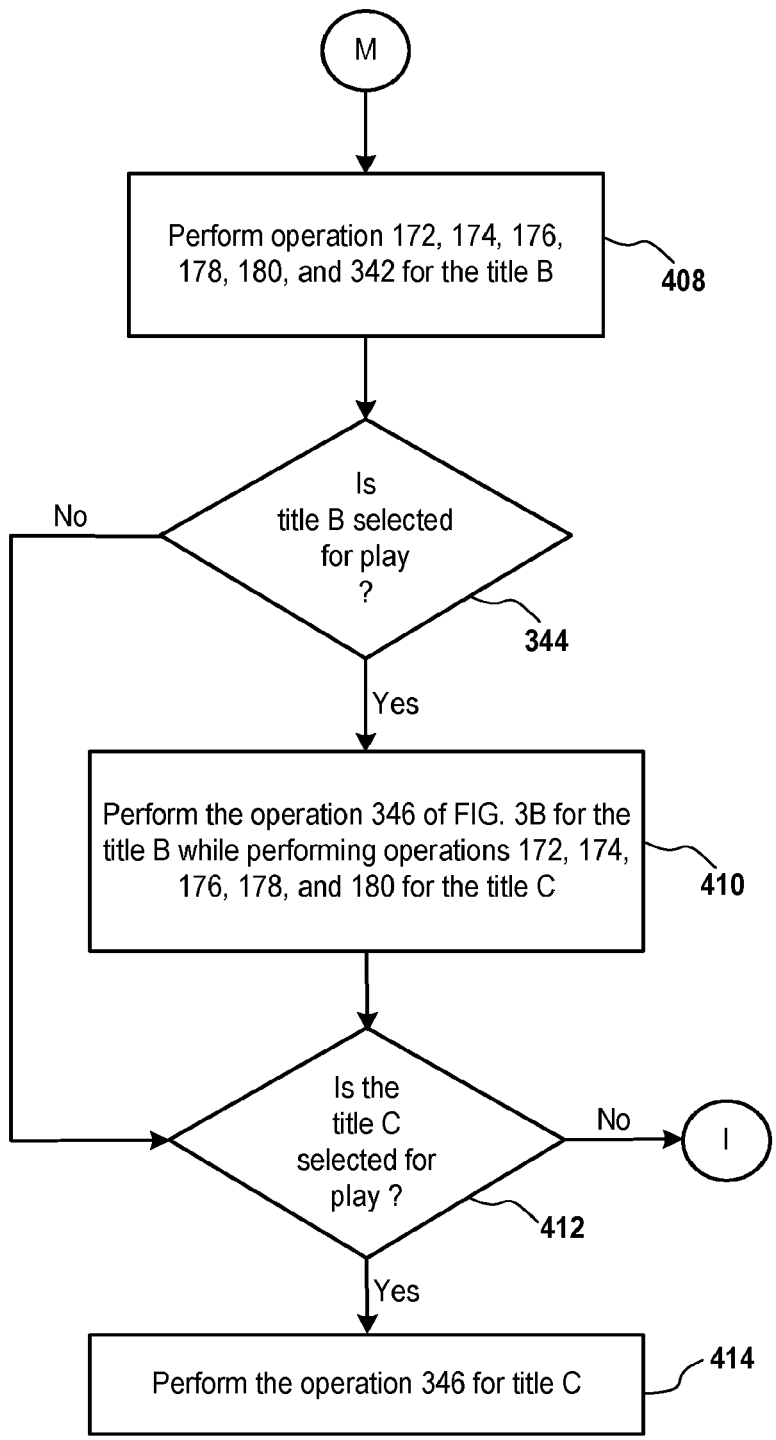
FIG. 4B is a continuation of the flowchart of FIG. 4A.

FIG. 4B is a continuation of the flowchart of FIG. 4A. In an operation 408 of the method 400, the save data processor performs the operations 172, 174, 176, 178, 180, and 342 for the Title B. In the operation 344 of the method 400, it is determined whether the Title B is selected for game play by the user A via his/her user account. Upon determining that the Title B is selected for game play, in an operation 410 of the method 400, the operation 346 is performed while the operations 172, 174, 176, 178, and 180 are performed for the Title C.

In an operation 412 of the method 400, it is determined by the save data processor whether the Title C is selected for game play by the user A via his/her user account. The save data processor determines whether the Title C is selected for game play in the same manner of performing the operation 344 except that the operation 412 is performed for the Title C.

Upon determining that the Title C is selected for game play by the user A, in an operation 414 of the method 400, the operation 346 is performed for the Title C. On the other hand, upon determining that the Title C is not selected for game play, a portion of the method 300 described with reference to FIG. 3C is performed.

In some embodiments, the operations of the method 400 described above as being performed by the save data processor are instead performed by the processor of the game hosting system. For example, the operations 402, 404, 406, 344, and 412 are performed by the game hosting system instead of by the save data processor. For example, upon performing the operation 402, the game hosting system sends a signal to the save data processor to indicate to the save data processor whether the Titles B and C are frequently played by the user A via his/her user account. As another example, upon performing the operation 404, the game hosting system sends a signal to the save data processor to indicate to the save data processor the latest times at which the games having the Titles B and C are played by the user A. As still another example, upon performing the operation 406, the game hosting system sends a signal to the save data processor to indicate to the save data processor whether the current time is within the threshold period from the latest time at which the game having the Title B is played by the user A and within the threshold period from the latest time at which the game having the Title C is played by the user A. As yet another example, upon performing the operation 344 of the method 400, the game hosting system sends a signal to the save data processor to indicate to the save data processor that the Title B is selected by the user A for game play. As another example, upon performing the operation 412, the game hosting system sends a signal to the save data processor to indicate to the save data processor that the Title C is selected by the user A for game play.

Figure 5:
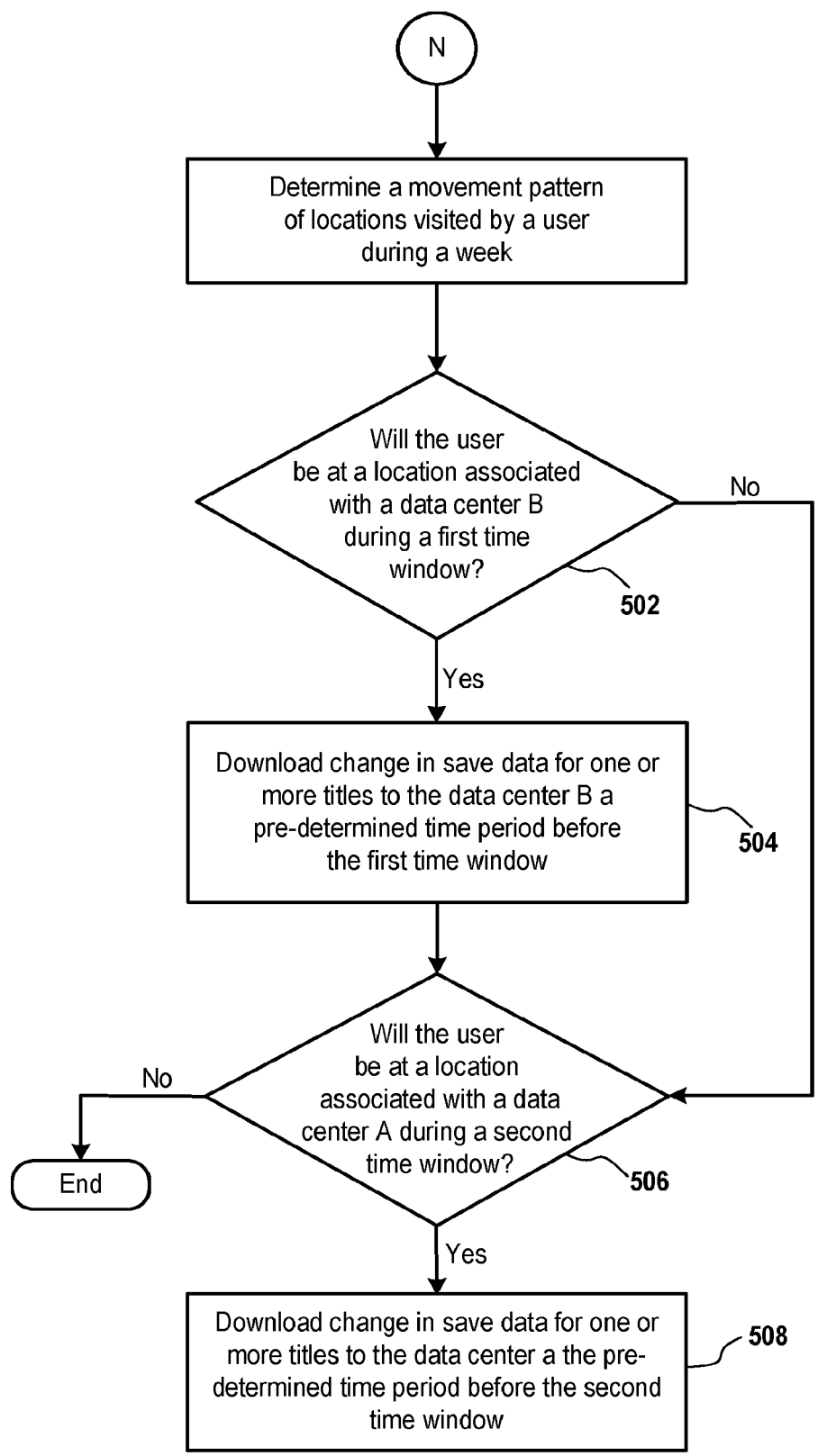
FIG. 5 is a flowchart of an embodiment of a method to illustrate use of the historical data to pre-download the save data for the Title B at a data center.

FIG. 5 is a flowchart of an embodiment of a method 500 to illustrate use of the historical data to pre-download the save data for the Title B at a data center. In some embodiments, the method 500 is executed after the operation 186 (FIG. 1D) of the method 170 is executed. The historical data includes a movement pattern of the user A. The client device includes the GPS transceiver that communicates with two or more satellites to determine a geo-location, e.g., longitude, or latitude, or both latitude and longitude, or altitude, or the longitude, the latitude, and the altitude, etc., of the client device. When the user A is the location A, which is in one geographical region, the GPS transceiver of the client device determines a global position of the client device. When the user A logs into his/her user account while at the location A, the client device sends a global position identifying the location A via the computer network to the game hosting system. The game hosting system determines a time A at which the location A is received from the client device and provides a mapping between the time A and the location A to the user account management for storage within the user account memory device as the historical data. The time A is identified by a calendar date and time, which occurs on a day of a week. When the user A is at the location A, the game having the Title B is accessed by the client device from the data center A for game play by the user A. Similarly, when the user A logs into his/her user account while at a location B, which is a different geographical region than the location A, the client device calculates and sends a geo-location identifying the location B via the computer network to the game hosting system. The game hosting system determines a time B at which the location B is received from the client device and provides a mapping between the time B and the location B to the user account management to store the mapping within the user account memory device as the historical data. The time B is identified by a calendar date and time, which occurs on a day of a week. The day of the week identified by the time B is different from the day of the week identified by the time A. When the user A is at the location B, the game having the Title B is accessed by the client device from the data center B for game play by the user A. Examples of a geographical region include a city, a state, a country, a county, a town, a street, a building, a room, etc.

In an operation 502 of the method 500, the processor of the game hosting system determines whether the user A will be at the location B during a first time window, e.g., a day of a week, a time during a week, a date of a calendar month, etc. For example, the processor of the game hosting system identifies from the historical data the first time window during which the user A will be at the location A. The processor of the game hosting system determines from the historical data, that the user A visited the location B during a day, e.g., Thursday, Friday, Saturday, etc., of a week for greater than a pre-determined number of previous weeks, and accessed the game having the Title B via his/her user account the day of the week. The game is accessed from the data center B. The previous weeks precede a week during which the determination is made by the processor of the game hosting system. The processor of the game hosting system further determines that there is a probability that the user A will be at the location B during the day of the week on which the user A visited the location B and accessed the Title B for greater than the pre-determined number of previous weeks. As another example, the processor of the game hosting system determines from the historical data, that the user A visited the location B during a calendar date, e.g., Jul. 1, 2015, Jan. 2, 2016, etc., of a month for greater than a pre-determined number of previous months, and accessed the game having the Title B via his/her user account the calendar date of the months. The game is accessed from the data center B. The previous months precede a month during which the determination is made by the processor of the game hosting system. The processor of the game hosting system further determines that there is a probability that the user A will be at the location B during the calendar date of the month on which the user A visited the location B and accessed the Title B for greater than the pre-determined number of previous months. The processor of the game hosting system sends an indication to a save data processor of the data center B that the user A will be at the location B during the first time window.

Upon receiving the determination that the user A will be at the location B during the first time window, in an operation 504 of the method 500, the save data processor of the data center B downloads changes to the save data for the game identified by the Title B from the cloud storage via the computer network to the local storage of the data center B. The download is performed a pre-determined time period before the first time window during which the user A will be at the location B. The changes are those made to the save data since the user last accessed the game having the Title B from the data center B. The changes are uploaded from a data center to the cloud storage. In case the user A uses the client device to login to play the game having the Title B from the location B, the changes to the save data are pre-downloaded to the data center B to reduce latency of transferring the changes to the data center B from the cloud storage and to increase throughput of transferring one or more image frames from the data center B to the client device. The one or more image frames are generated based on the changes to the save data and the save data stored in the data center B.

In an operation 506 of the method 500, the game hosting system determines whether the user A will be at the location A during a second time window, e.g., a day of a week, a time during a week, a date of a calendar month, etc. The processor of the game hosting system identifies from the historical data the second time window during which the user A will be at the location A. For example, the processor of the game hosting system determines from the historical data, that the user A visited the location A during a day, e.g., Sunday, Monday, Tuesday, Wednesday, etc., of a week for greater than the pre-determined number of previous weeks, and accessed the game having the Title B via his/her user account the day of the week. The game is accessed from the data center A. The previous weeks precede a week during which the determination is made by the processor of the game hosting system. The processor of the game hosting system further determines that there is a probability that the user A will be at the location A during the day of the week on which the user A visited the location A and accessed the Title B for greater than the pre-determined number of previous weeks. As another example, the processor of the game hosting system determines from the historical data, that the user A visited the location A during a calendar date, e.g., Aug. 2, 2015, Dec. 10, 2015, etc., of a month for greater than the pre-determined number of previous months, and accessed the game having the Title B via his/her user account the calendar date of the months. The game is accessed from the data center A. The previous months precede a month during which the determination is made by the processor of the game hosting system. The processor of the game hosting system further determines that there is a probability that the user A will be at the location A during the calendar date of the month on which the user A visited the location A and accessed the Title B for greater than the pre-determined number of previous months. The processor of the game hosting system sends an indication to the save data processor of the data center A that the user A will be at the location A during the second time window.

Upon receiving the determination that the user A will be at the location A during the second time window, in an operation 508 of the method 500, the save data processor of the data center A downloads changes to the save data for the game identified by the Title B from the cloud storage via the computer network to the local storage of the data center A. The download is performed the pre-determined time period before the second time window during which the user A will be at the location A. The changes are those made to the save data since the user last accessed the game having the Title B from the data center A. The changes are uploaded from a data center to the cloud storage. In case the user A uses the client device to login to play the game having the Title B while at the location A, the changes to the save data are pre-downloaded to the data center A to reduce latency of transferring the changes to the data center A from the cloud storage and to increase throughput of transferring one or more image frames from the data center A to the client device. The one or more image frames are generated based on the changes to the save data and the save data stored in the local storage of the data center A.

Figure 6:
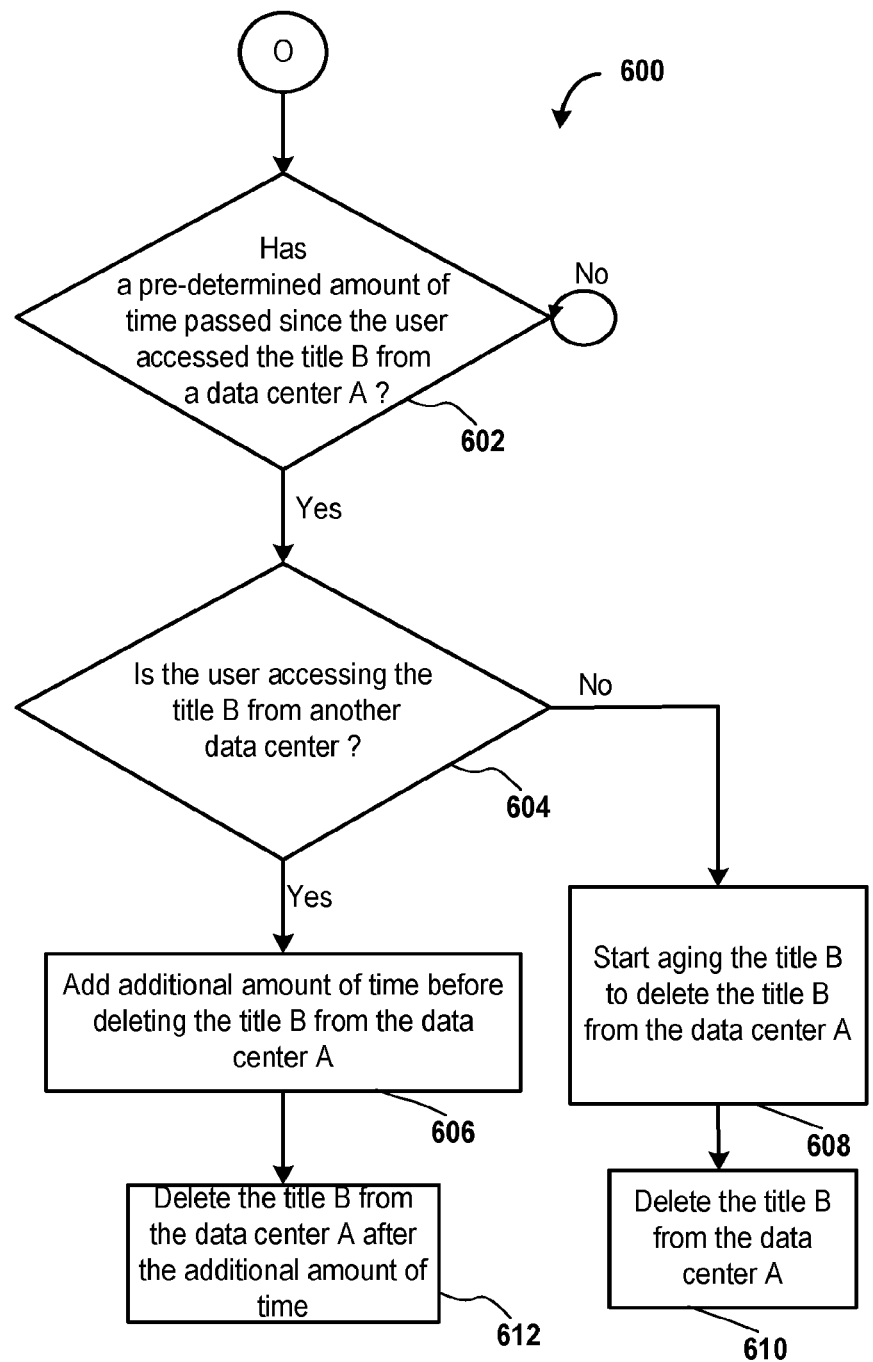
FIG. 6 is a flowchart of an embodiment of a method for illustrating deletion of the save data of the game having the Title B from the data center A.

FIG. 6 is a flowchart of an embodiment of a method 600 for illustrating deletion of save data of the game having the Title B from the data center A. In some embodiments, the method 600 is performed after performing the operation 186 of the method 170 of FIG. 1D. In an operation 602 of the method 600, the processor of the game hosting system determines whether a pre-determined amount of time has passed since the user A accessed the game having the Title B from the data center A. For example, the processor of the game hosting system determines a latest calendar date on which the user A downloaded the save data for playing the game having the Title B from the data center A and logged off his/her user account after playing the game. The processor determines, from a clock, e.g., the Internet clock, etc., whether the pre-determined amount of time has passed since the user A accessed the save data for the game having the Title B.

Upon determining that the pre-determined amount of time has passed, the processor of the game hosting system determines whether the user A has accessed the game having the Title B from any other data center B thru N1 after accessing the game from the data center A. For example, the processor of the game hosting system determines a latest calendar date on which the user A downloaded the save data for playing the game having the Title B from the data center B and logged off his/her user account after playing the game. The user A downloaded the save data for playing the game from the data center B after the user A downloads the save data for playing the game from the data center A. In this case, the user A has accessed the save data from the data center B.

Upon determining that the user A has not accessed the game having the Title B from any of the remaining data centers B through N1, in an operation 608 of the method 600, the processor of the game hosting system sends a signal to the save data processor of the data center A to start aging the save data for the Title B from the local storage of the data center A. Upon receiving the signal, the save data processor sends a command to a timer of the data center A to start a time countdown to a pre-set time limit to delete the save data for the Title B from the data center A. Upon determining that the pre-set time limit is reached, in an operation 610 of the method 600, the save data processor sends a signal to the local storage of the data center A to delete the save data for the Title B from the local storage of the data center A.

On the other hand, upon determining that the user A has accessed the save data for the Title B from another one of the data centers B through N1, in an operation 606 of the method 600, the processor of the game hosting system adds an additional amount of time before deleting the save data for the Title B from the data center A. For example, the processor of the game hosting system determines to add the pre-determined amount of time to a time at which the user A accessed the save data for the Title B from the data center B. After the additional amount of time has passed, the processor of the game hosting system sends a signal to the save data processor of the data center A to delete, e.g., erase, etc., the save data for the Title B from the local storage of the data center A. In an operation 612 of the method 600, the save data processor deletes the save data for the Title B from the local storage of the data center A.

In various embodiments, the operations described herein as being performed by the save data processor are performed by the game hosting system or a combination of the save data processor and the game hosting system. For example, some of the operations of a method described herein are performed by the processor of the game hosting system and remaining operations of the method are performed by the save data processor.

In some embodiments, operations described herein of communication of information between a data center and the game hosting system are performed via a computer network between the data center and the game hosting system. The computer network between the data center and the game hosting system, in some embodiments, is other than that shown in FIG. 1C-1. When the computer network is used between the data center and the game hosting system, information sent from the processor of the game hosting system is packetized, e.g., embedded within one or more packets, etc., by the datacenter communication device connected to the game hosting system to generate the one or more packets, which are sent to the communication device of the data center via the computer network between the data center and the game hosting system. The communication device of the data center applies the communication protocol to the one or more packets to depacketize and extract the information from the one or more packets and provides the one or more packets to a save data processor of the data center for processing and/or to a game server of the data center for processing. Similarly, when the computer network is used between the data center and the game hosting system, information sent from the save data processor of the data center or from the game server of the data center is packetized, e.g., embedded within one or more packets, etc., by the communication device of the data center to generate the one or more packets, which are sent to the datacenter communication device connected to the game hosting system via the computer network between the data center and the game hosting system. The communication device of the game hosting system applies the communication protocol to the one or more packets to depacketize the information to extract the information from the one or more packets and provides the one or more packets to the processor of the game hosting system for processing.

Figure 7:
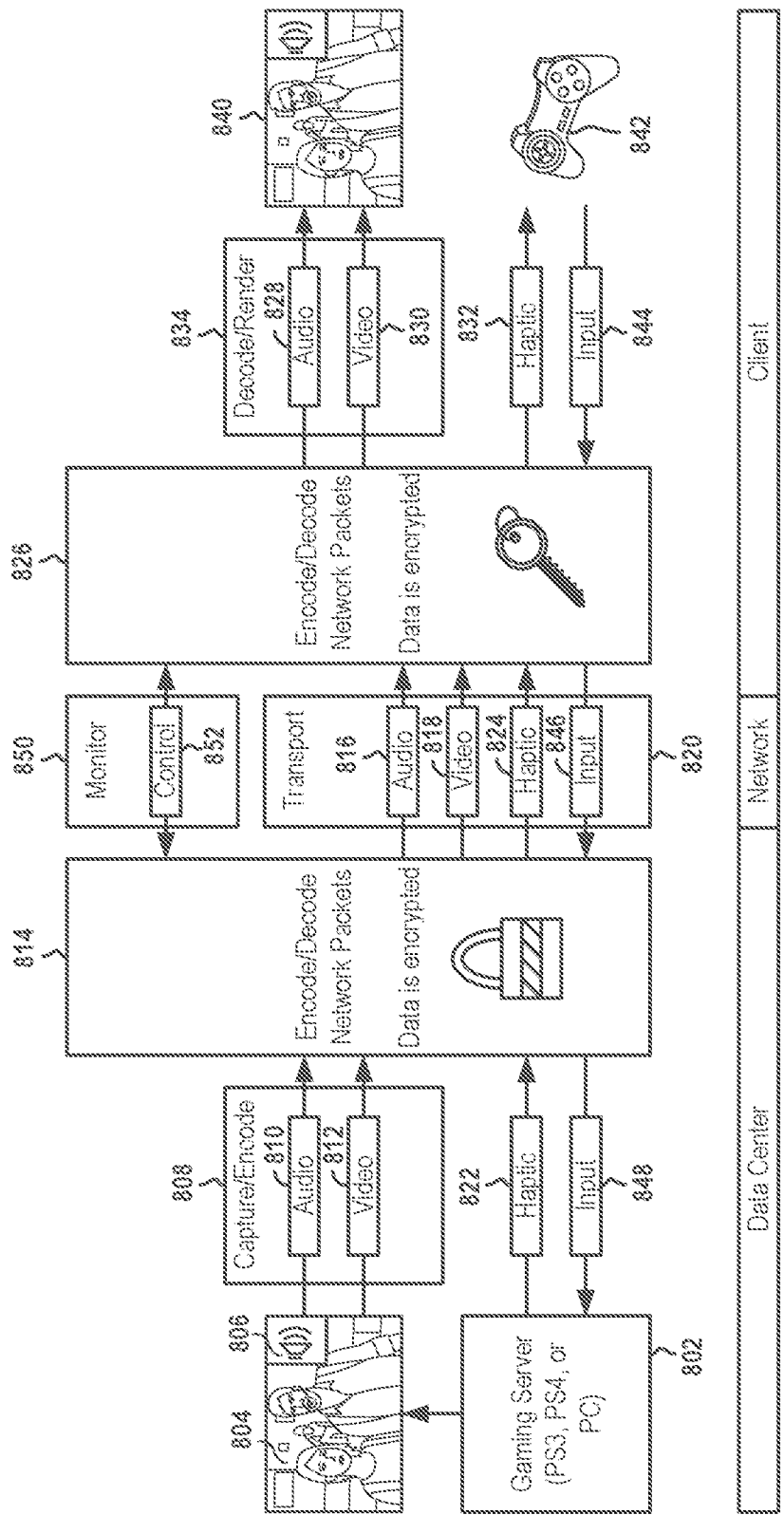
FIG. 7 is a flow diagram illustrating various operations, which are performed for streaming a cloud video game to a client device.

FIG. 7 is a flow diagram conceptually illustrating various operations which are performed for streaming a cloud video game to a client device, in accordance with implementations of the disclosure. A game server 802 executes a video game and generates raw (uncompressed) video 804 and audio 806. The video 804 and audio 806 are captured and encoded for streaming purposes, as indicated at reference 808 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 810 and encoded video 812 are further packetized into network packets, as indicated at reference numeral 814, for purposes of transmission over the computer network such as the Internet. In some embodiments, the network packet encoding process also employs a data encryption process, thereby providing enhanced data security. In the illustrated implementation, audio packets 816 and video packets 818 are generated for transport over the computer network, as indicated at reference 820.

The game server 802 additionally generates haptic feedback data 822, which is also packetized into network packets for network transmission. In the illustrated implementation, haptic feedback packets 824 are generated for transport over the computer network, as further indicated at reference 820.

The foregoing operations of generating the raw video and audio and the haptic feedback data are performed on the gamer server 802 of a data center, and the operations of encoding the video and audio, and packetizing the encoded audio/video and haptic feedback data for transport are performed by the streaming engine of the data center. As indicated at reference 820, the audio, video, and haptic feedback packets are transported over the computer network. As indicated at reference 826, the audio packets 816, video packets 818, and haptic feedback packets 824, are disintegrated, e.g., parsed, etc., by the client device to extract encoded audio 828, encoded video 830, and haptic feedback data 832 at the client device from the network packets. If data has been encrypted, then the data is also decrypted. The encoded audio 828 and encoded video 830 are then decoded by the client device, as indicated at reference 834, to generate client-side raw audio and video data for rendering on a display device 840 of the client device. The haptic feedback data 832 is processed by the processor of the client device to produce a haptic feedback effect at a controller device 842 or other interface device, e.g., the HMD, etc., through which haptic effects can be rendered. One example of a haptic effect is a vibration or rumble of the controller device 842.

It will be appreciated that a video game is responsive to user inputs, and thus, a similar procedural flow to that described above for transmission and processing of user input, but in the reverse direction from client device to server, is performed. As shown, a controller device 842 or another input device, e.g., the body part of the user A, etc., or a combination thereof generates input data 844. This input data 844 is packetized at the client device for transport over the computer network to the data center. Input data packets 846 are unpacked and reassembled by the game server 802 to define input data 848 on the data center side. The input data 848 is fed to the game server 802, which processes the input data 848 to update save data for a game state of the game.

During transport (ref. 820) of the audio packets 816, the video packets 818, and haptic feedback packets 824, in some embodiments, the transmission of data over the computer network is monitored to ensure a quality of service. For example, network conditions of the computer network are monitored as indicated by reference 850, including both upstream and downstream network bandwidth, and the game streaming is adjusted in response to changes in available bandwidth. That is, the encoding and decoding of network packets is controlled based on present network conditions, as indicated by reference 852.

Figure 8:
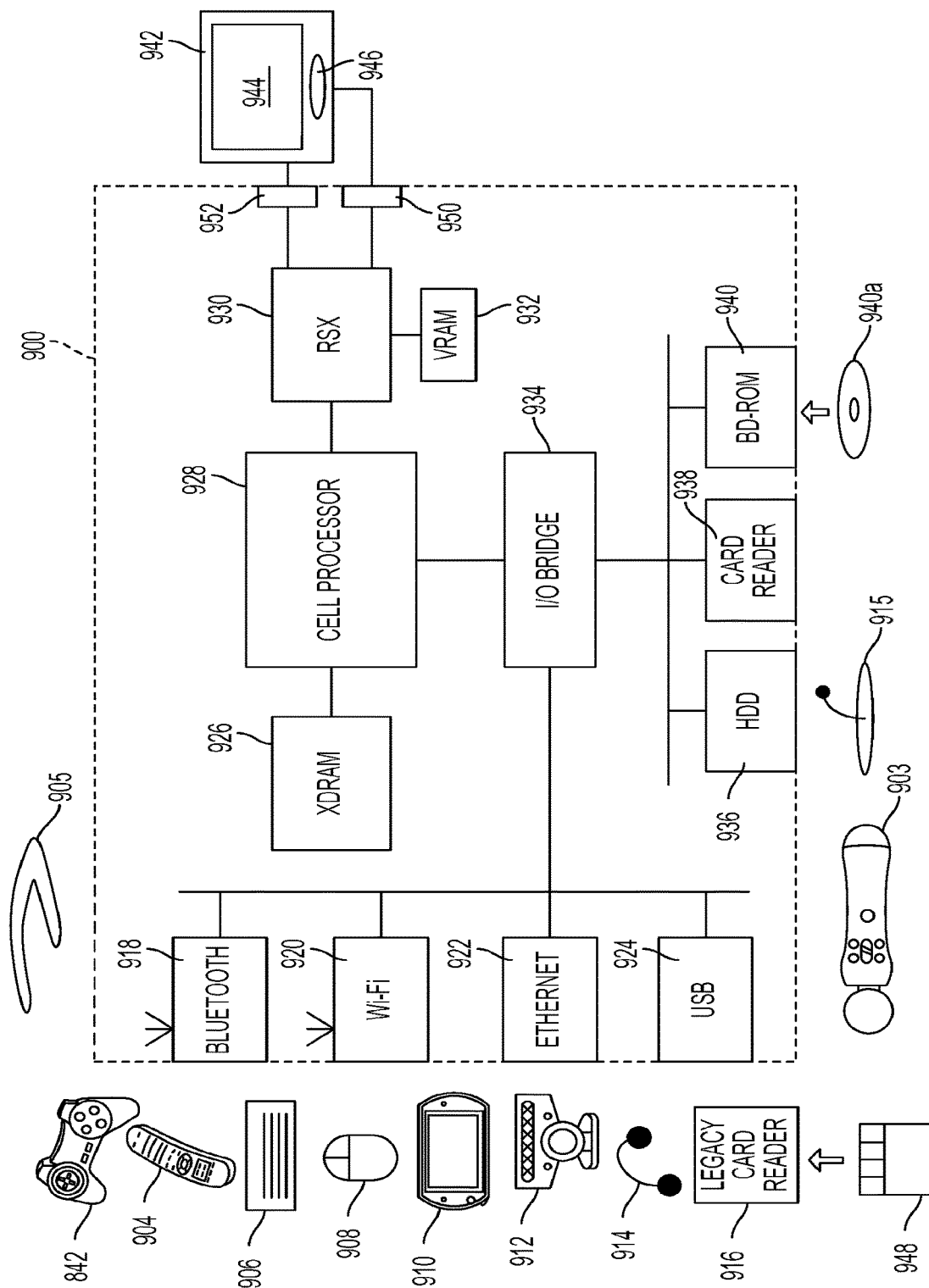
FIG. 8 is a block diagram of an embodiment of a game console that is compatible for interfacing with a display device of the client device or is capable of communicating via a computer network with the game hosting system.

FIG. 8 is a block diagram of an embodiment of a game console 900 that is compatible for interfacing with the display device of the client device and is capable of communicating via the computer network with the game hosting system. The game console 900 is located within the data center A or is located at a location at which the user A is located. In some embodiments, the game console 900 is used to execute a game that is displayed on the HMD. The game console 900 is provided with various peripheral devices connectable to the game console 900. The game console 900 has a cell processor 928, a dynamic random access memory (XDRAM) unit 926, a Reality Synthesizer graphics processor unit 930 with a dedicated video random access memory (VRAM) unit 932, and an input/output (I/O) bridge 934. The game console 900 also has a Blu Ray® Disk read-only memory (BD-ROM) optical disk reader 940 for reading from a disk 940a and a removable slot-in hard disk drive (HDD) 936, accessible through the I/O bridge 934. Optionally, the game console 900 also includes a memory card reader 938 for reading compact flash memory cards, memory Stick® memory cards and the like, which is similarly accessible through the I/O bridge 934. The I/O bridge 934 also connects to Universal Serial Bus (USB) 2.0 ports 924, a gigabit Ethernet port 922, an IEEE 802.11b/g wireless network (Wi-Fi) port 920, and a Bluetooth® wireless link port 918 capable of supporting Bluetooth connections.

In operation, the I/O bridge 934 handles all wireless, USB and Ethernet data, including data from game controllers 842 and/or 903 and from the HMD 905. For example, when the user A is playing a game generated by execution of a portion of a game code, the I/O bridge 934 receives input data from the game controllers 842 and/or 903 and/or from the HMD 905 via a Bluetooth link and directs the input data to the cell processor 928, which updates a current state of the game accordingly. As an example, a camera within the HMD 905 captures a gesture of a user and to generate an image representing the gesture. The image is an example of the input data. Each game controller 842 and 903 is an example of a hand-held controller (HHC).

The wireless, USB and Ethernet ports also provide connectivity for other peripheral devices in addition to game controllers 842 and 903 and the HMD 905, such as, for example, a remote control 904, a keyboard 906, a mouse 908, a portable entertainment device 910, such as, e.g., a Sony Playstation Portable® entertainment device, etc., a video camera, such as, e.g., an EyeToy® video camera 912, etc., a microphone headset 914, and a microphone 915. In some embodiments, such peripheral devices are connected to the game console 900 wirelessly, for example, the portable entertainment device 910 communicates via a Wi-Fi ad-hoc connection, whilst the microphone headset 914 communicates via a Bluetooth link.

The provision of these interfaces means that the game console 900 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 916 is connected to the game console 900 via the USB port 924, enabling the reading of memory cards 948 of a kind used by the game console 900. The game controllers 842 and 903 and the HMD 905 are operable to communicate wirelessly with the game console 900 via the Bluetooth link 918, or to be connected to the USB port 924, thereby also receiving power by which to charge batteries of the game controller 842 and 903 and the HMD 905. In some embodiments, each of the game controllers 842 and 903 and the HMD 905 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 900, and wireless devices using protocols, such as, e.g., Bluetooth, Wi-Fi, etc.

The game controller 842 is a controller designed to be used with two hands of the user A, and game controller 903 is a single-hand controller with an attachment. The HMD 905 is designed to fit on top of a head and/or in front of eyes of the user A. In addition to one or more analog joysticks and conventional control buttons, each game controller 842 and 903 is susceptible to three-dimensional location determination. Similarly, the HMD 905 is susceptible to three-dimensional location determination. Consequently, in some embodiments, gestures and movements by the user A of the game controller 842 and 903 and of the HMD 905 are translated as inputs to a game in addition to or instead of conventional button or joystick commands Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 904 is also operable to communicate wirelessly with the game console 900 via the Bluetooth link 918. The remote control 904 includes controls suitable for the operation of the Blu Ray™ Disk BD-ROM reader 940 and for navigation of disk content.

The Blu Ray™ Disk BD-ROM reader 940 is operable to read CD-ROMs compatible with the game console 900, in addition to conventional pre-recorded and recordable CDs, and so-called Super Audio CDs. The Blu Ray™ Disk BD-ROM reader 940 is also operable to read digital video disk-ROMs (DVD-ROMs) compatible with the game console 900, in addition to conventional pre-recorded and recordable DVDs. The Blu Ray™ Disk BD-ROM reader 940 is further operable to read BD-ROMs compatible with the game console 900, as well as conventional pre-recorded and recordable Blu-Ray Disks.

The game console 900 is operable to supply audio and video, either generated or decoded via the Reality Synthesizer graphics unit 930, through audio connectors 950 and video connectors 952 to a display and sound output device 942, such as, e.g., a monitor or television set, etc., having a display screen 944 and one or more loudspeakers 94, or to supply the audio and video via the Bluetooth® wireless link port 918 to the display device of the HMD 905. The audio connectors 950, in various embodiments, include conventional analogue and digital outputs whilst the video connectors 952 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 908. An operating system of the game console 900 supports Dolby® 5.1 surround sound, Dolby® Theatre Surround (DTS), and the decoding of 7.1 surround sound from Blu-Ray® disks.

In some embodiments, a video camera, e.g., the video camera 912, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 900. An LED indicator of the video camera 912 is arranged to illuminate in response to appropriate control data from the game console 900, for example, to signify adverse lighting conditions, etc. Some embodiments of the video camera 912 variously connect to the game console 900 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 900, an appropriate piece of software, such as, a device driver, etc., is provided.

In some embodiments, the aforementioned system devices, including the game console 900, the HHC, and the HMD 905 enable the HMD 905 to display and capture video of an interactive session of a game. The system devices initiate an interactive session of a game, the interactive session defining interactivity between the user A and the game. The system devices further determine an initial position and orientation of the HHC and/or the HMD 905 operated by the user A. The game console 900 determines a current state of a game based on the interactivity between the user A and the game. The system devices track a position and orientation of the HHC and/or the HMD 905 during an interactive session of the user A with a game. The system devices generate a spectator video stream of the interactive session based on a current state of a game and the tracked position and orientation of the HHC and/or the HMD 905. In some embodiments, the HHC renders the spectator video stream on a display screen of the HHC. In various embodiments, the HMD 905 renders the spectator video stream on a display screen of the HMD 905.

Figure 9:
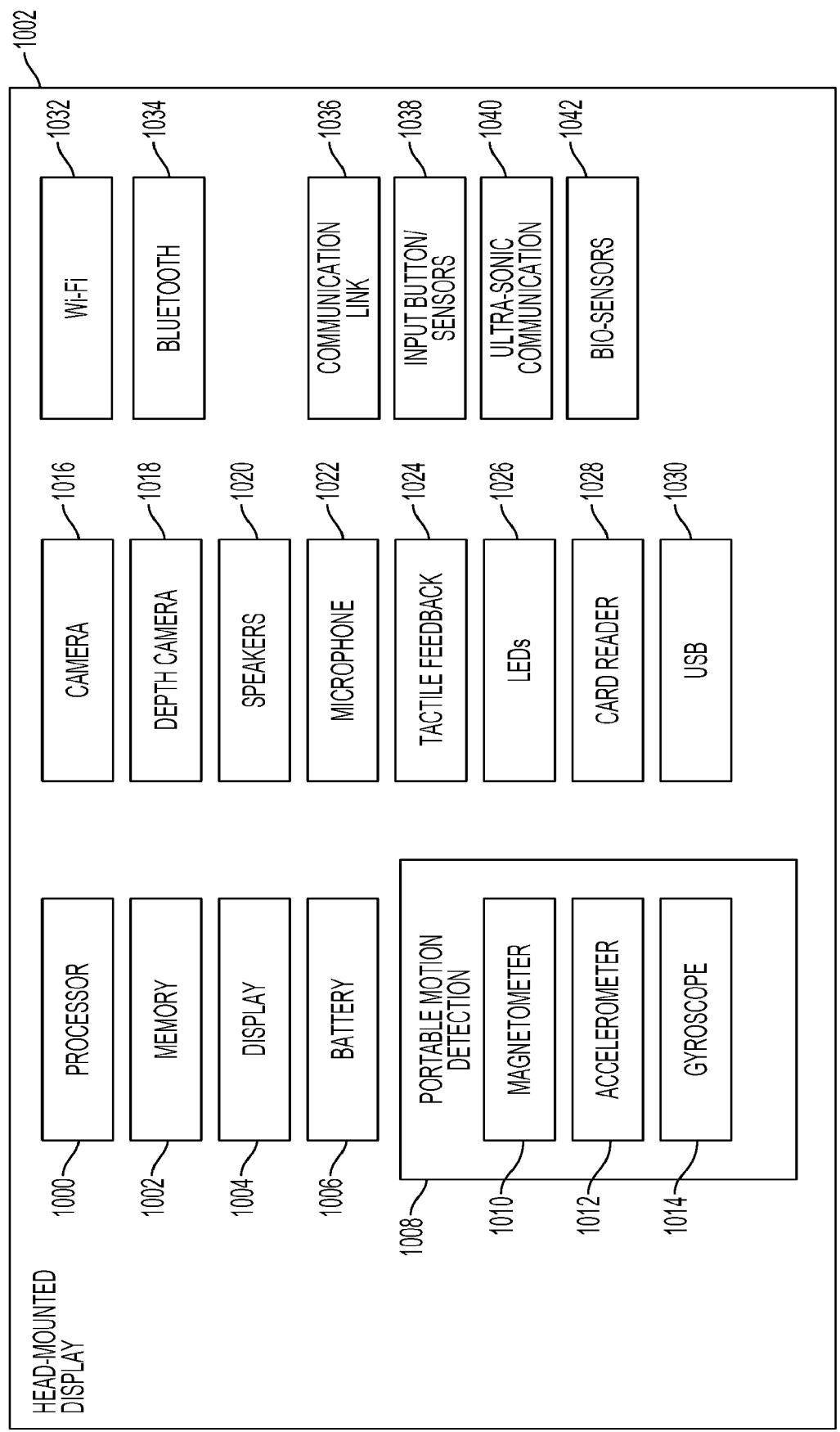
FIG. 9 is a diagram of an embodiment of a head-mounted display (HMD).

With reference to FIG. 9, a diagram illustrating components of an HMD 1002 is shown. The HMD 1002 is an example of the HMD 905 (FIG. 8). The HMD 1002 includes a processor 1000 for executing program instructions. A memory device 1002 is provided for storage purposes. Examples of the memory device 1002 include a volatile memory, a non-volatile memory, or a combination thereof. A display device 1004 is included which provides a visual interface, e.g., display of image frames generated from save data, etc., that the user A (FIG. 1) views. A battery 1006 is provided as a power source for the HMD 1002. A motion detection module 1008 includes any of various kinds of motion sensitive hardware, such as a magnetometer 1010, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1012 are used to provide the direction of gravity, which gives an absolute reference for two angles, e.g., world-space pitch and world-space roll, etc.

A magnetometer measures a strength and a direction of a magnetic field in a vicinity of the HMD 1002. In some embodiments, three magnetometers 1010 are used within the HMD 1002, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1014, a camera 1016, etc. In one embodiment, the accelerometer 1012 is used together with magnetometer 1010 to obtain the inclination and azimuth of the HMD 1002.

A gyroscope is a device for measuring or maintaining orientation, based on the principles of angular momentum. In one embodiment, instead of the gyroscope 1014, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1016 is provided for capturing images and image streams of a real-world environment, e.g., room, cabin, natural environment, etc., surrounding the user A. In various embodiments, more than one camera is included in the HMD 1002, including a camera that is rear-facing, e.g., directed away from the user A when the user A is viewing the display of the HMD 1002, etc., and a camera that is front-facing, e.g., directed towards the user A when the user A is viewing the display of the HMD 1002, etc. Additionally, in several embodiments, a depth camera 1018 is included in the HMD 1002 for sensing depth information of objects in the real-world environment.

The HMD 1002 includes speakers 1020 for providing audio output. Also, a microphone 1022 is included, in some embodiments, for capturing audio from the real-world environment, including sounds from an ambient environment, and speech made by the user A, etc. The HMD 1002 includes a tactile feedback module 1024, e.g., a vibration device, etc., for providing tactile feedback to the user A. In one embodiment, the tactile feedback module 1024 is capable of causing movement and/or vibration of the HMD 1002 to provide tactile feedback to the user A.

LEDs 1026 are provided as visual indicators of statuses of the HMD 1002. For example, an LED may indicate battery level, power on, etc. A card reader 1028 is provided to enable the HMD 1002 to read and write information to and from a memory card. A USB interface 1030 is included as one example of an interface for enabling connection of peripheral devices, or connection to other devices, such as other portable devices, computers, etc. In various embodiments of the HMD 1002, any of various kinds of interfaces may be included to enable greater connectivity of the HMD 1002.

A Wi-Fi module 1032 is included for enabling connection to the Internet via wireless networking technologies. Also, the HMD 1002 includes a Bluetooth module 1034 for enabling wireless connection to other devices. A communications link 1036 is also included, in some embodiments, for connection to other devices. In one embodiment, the communications link 1036 utilizes infrared transmission for wireless communication. In other embodiments, the communications link 1036 utilizes any of various wireless or wired transmission protocols for communication with other devices.

Input buttons/sensors 1038 are included to provide an input interface for the user A (FIG. 1). Any of various kinds of input interfaces are included, such as buttons, touchpad, joystick, trackball, etc. An ultra-sonic communication module 1040 is included, in various embodiments, in the HMD 1002 for facilitating communication with other devices via ultra-sonic technologies.

Bio-sensors 1042 are included to enable detection of physiological data from a user. In one embodiment, the bio-sensors 1042 include one or more dry electrodes for detecting bio-electric signals of the user through the user's skin.

The foregoing components of HMD 1002 have been described as merely exemplary components that may be included in HMD 1002. In various embodiments, the HMD 1002 include or do not include some of the various aforementioned components.

Figure 10:
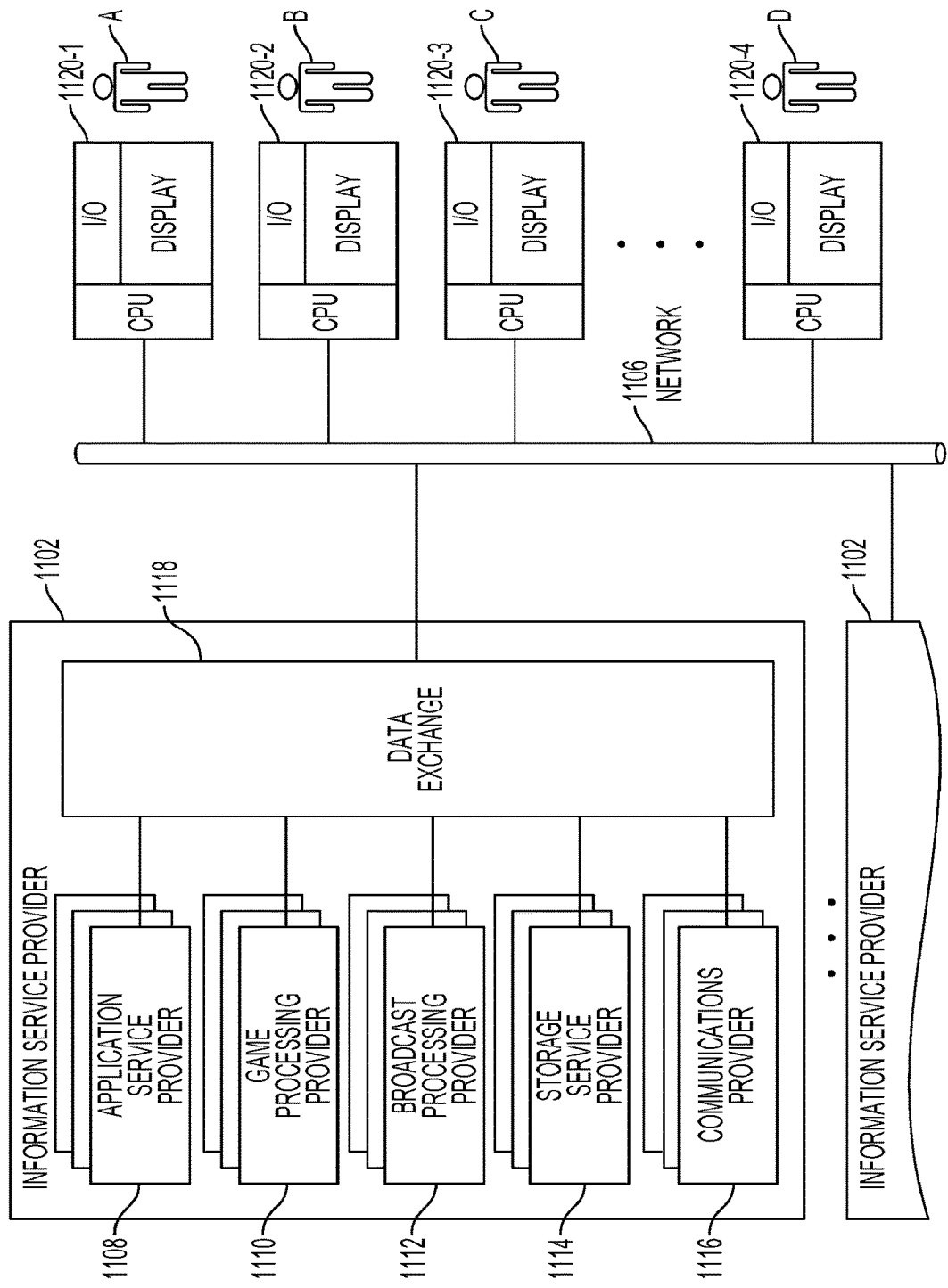
FIG. 10 illustrates an embodiment of an Information Service Provider (INSP) architecture.

FIG. 10 illustrates an embodiment of an Information Service Provider (INSP) architecture. INSPs 1102 delivers a multitude of information services to users A, B, C, and D geographically dispersed and connected via a computer network 1106, e.g., a LAN, a WAN, or a combination thereof, etc. An example of the WAN includes the Internet and an example of the LAN includes an Intranet. The user A operates a client device 1120-1, the user B operates another client device 1120-2, the user C operates yet another client device 1120-3, and the user D operates another client device 1120-4.

In some embodiments, each client device 1120-1, 1120-2, 1120-3, and 1120-4 includes a central processing unit (CPU), a display, and an input/output (I/O) interface. Examples of each client device 1120-1, 1120-2, 1120-3, and 1120-4 include a personal computer (PC), a mobile phone, a netbook, a tablet, a gaming system, a personal digital assistant (PDA), the game console 900 and a display device, the HMD 1022 (FIG. 9), the game console 900 and the HMD 1022, a desktop computer, a laptop computer, a smart television, etc. In some embodiments, the INSP 1102 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 1120-1 is served by an INSP in near proximity to the client device 1120-1 while the client device 1120-1 is in a home town of the user A, and client device 1120-1 is served by a different INSP when the user A travels to a different city. The home-town INSP will transfer requested information and data to the new INSP, such that the information "follows" the client device 1120-1 to the new city making the data closer to the client device 1120-1 and easier to access. In various embodiments, a master-server relationship is established between a master INSP, which manages the information for the client device 1120-1, and a server INSP that interfaces directly with the client device 1120-1 under control from the master INSP. In some embodiments, data is transferred from one ISP to another ISP as the client device 1120-1 moves around the world to make the INSP in better position to service client device 1120-1 be the one that delivers these services.

The INSP 1102 includes an Application Service Provider (ASP) 2208, which provides computer-based services to customers over the computer network 1106. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 1120-1, 1120-2, 1120-3, and 1120-4 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 1106. The users A, B, C, and D do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 1106, e.g., using servers, storage and logic, etc., based on how the computer network 1106 is depicted in computer network diagrams and is an abstraction for the complex infrastructure it conceals.

Further, the INSP 1102 includes a game processing provider (GPP) 1110, also sometime referred to herein as a game processing server, which is used by the client devices 1120-1, 1120-2, 1120-3, and 1120-4 to play single and multiplayer video games. Most video games played over the computer network 1106 operate via a connection to a game server. Typically, games use a dedicated server application that collects data from the client devices 1120-1, 1120-2, 1120-3, and 1120-4 and distributes it to other clients that are operated by other users. This is more efficient and effective than a peer-to-peer arrangement, but a separate server is used to host the server application. In some embodiments, the GPP 1110 establishes communication between the client devices 1120-1, 1120-2, 1120-3, and 1120-4, which exchange information without further relying on the centralized GPP 1110.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 1112, sometimes referred to herein as a broadcast processing provider, distributes audio or video signals to an audience. Broadcasting to a very narrow range of audience is sometimes called narrowcasting. A final leg of broadcast distribution is how a signal gets to the client devices 1120-1, 1120-2, 1120-3, and 1120-4, and the signal, in some embodiments, is distributed over the air as with a radio station or a television station to an antenna and receiver, or through a cable television or cable radio or "wireless cable" via the station. The computer network 1106 also brings, in various embodiments, either radio or television signals to the client devices 1120-1, 1120-2, 1120-3, and 1120-4, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 1114 provides computer storage space and related management services. The SSP 1114 also offers periodic backup and archiving. By offering storage as a service, the client devices 1120-1, 1120-2, 1120-3, and 1120-4 use more storage compared to when storage is not used as a service. Another major advantage is that the SSP 1114 includes backup services and the client devices 1120-1, 1120-2, 1120-3, and 1120-4 will not lose data if their hard drives fail. Further, a plurality of SSPs, in some embodiments, have total or partial copies of the data received from the client devices 1120-1, 1120-2, 1120-3, and 1120-4, allowing the client devices 1120-1, 1120-2, 1120-3, and 1120-4 to access data in an efficient way independently of where the client devices 1120-1, 1120-2, 1120-3, and 1120-4 are located or of types of the clients. For example, the user A accesses personal files via a home computer, as well as via a mobile phone while the user A is on the move.

A communications provider 1116 provides connectivity to the client devices 1120-1, 1120-2, 1120-3, and 1120-4. One kind of the communications provider 1116 is an Internet service provider (ISP) which offers access to the computer network 1106. The ISP connects the client devices 1120-1, 1120-2, 1120-3, and 1120-4 using a data transmission technology appropriate for delivering Internet Protocol datagrams, such as dial-up, digital subscriber line (DSL), cable modem, fiber, wireless or dedicated high-speed interconnects. The communications provider 1116 also provides, in some embodiments, messaging services, such as e-mail, instant messaging, and short message service (SMS) texting. Another type of a communications Provider is a network service provider (NSP), which sells bandwidth or network access by providing direct backbone access to the computer network 1106. Examples of network service providers include telecommunications companies, data carriers, wireless communications providers, Internet service providers, cable television operators offering high-speed Internet access, etc.

A data exchange 1118 interconnects the several modules inside INSP 1102 and connects these modules to the client devices 1120-1, 1120-2, 1120-3, and 1120-4 via computer network 1106. The data exchange 1118 covers, in various embodiments, a small area where all the modules of INSP 1102 are in close proximity, or covers a large geographic area when the different modules are geographically dispersed. For example, the data exchange 1102 includes a fast Gigabit Ethernet within a cabinet of a data center, or an intercontinental virtual LAN.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:
   determining whether a game title is played frequently;
   identifying a latest time at which the game title is played upon determining that the game title is played frequently;
   analyzing whether a current time is within a threshold of the latest time;
   inquiring whether save data for the game title is available at a data center upon determining that the current time is within the threshold of the latest time;
   downloading the save data from a cloud storage upon determining that the save data is unavailable at the data center;
   determining whether the game title is selected for game play; and
   processing the save data at the data center to generate one or more image frames upon determining that the game title is selected for game play.

2. The method of claim 1, wherein said determining whether the game title is played frequently comprises:
   determining that the game title is accessed for play via a user account for greater than a pre-determined number of times; or
   determining that the game title is played via a user account for greater than a pre-determined amount of time each time a player logs into the user account; or
   determining that the game title is played via the user account for an amount of time that is greater than an amount of time for which another game title is played each time the player logs into the user account.

3. The method of claim 1, further comprising determining that a player has not played the game title after the latest time.

4. The method of claim 1, wherein said analyzing whether the current time is within the threshold of the latest time comprises determining that the current time occurs within a pre-determined portion of a day, wherein the pre-determined portion of the day occurs after a pre-determined number of hours of the day.

5. The method of claim 1, wherein the save data includes a location in a game code at which a player stopped playing a game having the game title.

6. The method of claim 1, wherein said determining whether the save data is available at the data center comprises accessing a memory device of the data center to determine a plurality of game titles and determining whether the game title is one of the plurality of game titles.

7. The method of claim 1, further comprising sending a request for the save data from the data center to the cloud storage, wherein said downloading the save data from the cloud storage comprises receiving the save data via a computer network from the cloud storage for storage in the data center in response to the request.

8. A system within a data center, the system comprising:
   a memory device of the data center; and
   a processor of the data center, wherein the processor is coupled to the memory device, wherein the processor is configured to:
      determine whether a game title is played frequently;
      identify a latest time at which the game title is played upon determining that the game title is played frequently;
      analyze whether a current time is within a threshold of the latest time;
      inquire whether save data for the game title is available within the memory device upon determining that the current time is within the threshold of the latest time;
      download the save data from a cloud storage upon determining that the save data is unavailable from the memory device of the data center;
      determine whether the game title is selected for game play; and
      process the save data to generate one or more image frames upon determining that the game title is selected for game play.

9. The system of claim 8, wherein to determine whether the game title is played frequently, the processor is configured to:
   determine that the game title is accessed for play via a user account for greater than a pre-determined number of times; or
   determine that the game title is played via a user account for greater than a pre-determined amount of time each time a player logs into the user account; or
   determine that the game title is played via the user account for an amount of time that is greater than an amount of time for which another game is played each time the player logs into the user account.

10. The system of claim 8, wherein the processor is configured to determine that a player has not played the game title after the latest time.

11. The system of claim 8, wherein to analyze whether the current time is within the threshold of the latest time, the processor is configured to determine that the current time occurs within a pre-determined portion of a day, wherein the pre-determined portion of the day occurs after a pre-determined number of hours of the day.

12. The system of claim 8, wherein the save data includes a location in a game code at which a player stopped playing a game having the game title.

13. The system of claim 8, wherein to determine whether the save data is available from the memory device, the processor is configured to determine that the save data is stored within the memory device of the data center.

14. The system of claim 8, wherein the processor is configured to send a request for the save data to the cloud storage, wherein to download the save data from the cloud storage, the processor is configured to receive the save data via a computer network from the cloud storage for storage in the memory device in response to the request.

15. A system comprising:
   a cloud storage; and
   a data center coupled to the cloud storage via a computer network, wherein the data center is configured to:
      determine whether a game title is played frequently;
      identify a latest time at which the game title is played upon determining that the game title is played frequently;
      analyze whether a current time is within a threshold of the latest time;
      inquire whether save data for the game title is available at the data center upon determining that the current time is within the threshold of the latest time;
      download the save data from the cloud storage upon determining that the save data is unavailable at the data center;

determine whether the game title is selected for game play; and process the save data at the data center to generate one or more image frames upon determining that the game title is selected for game play.

16. The system of claim 15, wherein to determine whether the game title is played frequently, the data center is configured to:

determine that the game title is accessed for play via a user account for greater than a pre-determined number of times; or determine that the game title is played via a user account for greater than a pre-determined amount of time each time a player logs into the user account; or determine that the game title is played via the user account for an amount of time that is greater than an amount of time for which another game is played each time the player logs into the user account.

17. The system of claim 15, wherein the data center is configured to determine that a player has not played the game title after the latest time.

18. The system of claim 15, wherein to analyze whether the current time is within the threshold of the latest time, the data center is configured to determine that the current time occurs within a pre-determined portion of a day, wherein the pre-determined portion of the day occurs after a pre-determined number of hours of the day.

19. The system of claim 15, wherein the save data includes a location in a game code at which a player stopped playing a game having the game title.

20. The system of claim 15, wherein the data center includes a memory device, wherein to determine whether the save data is available at the data center, the data center is configured to determine that the save data is stored in the memory device.

* * * * *